(12) United States Patent
Ando

(10) Patent No.: US 11,694,408 B2
(45) Date of Patent: Jul. 4, 2023

(54) INFORMATION PROCESSING DEVICE, INFORMATION PROCESSING METHOD, PROGRAM, AND MOVABLE OBJECT

(71) Applicant: Sony Corporation, Tokyo (JP)

(72) Inventor: Yuji Ando, Tokyo (JP)

(73) Assignee: SONY CORPORATION, Tokyo (JP)

(*) Notice: Subject to any disclaimer, the term of this patent is extended or adjusted under 35 U.S.C. 154(b) by 170 days.

(21) Appl. No.: 17/257,013

(22) PCT Filed: Jul. 18, 2019

(86) PCT No.: PCT/JP2019/028209
§ 371 (c)(1),
(2) Date: Dec. 30, 2020

(87) PCT Pub. No.: WO2020/026825
PCT Pub. Date: Feb. 6, 2020

(65) Prior Publication Data
US 2021/0125417 A1   Apr. 29, 2021

(30) Foreign Application Priority Data

Aug. 1, 2018 (JP) ................................. 2018-144719

(51) Int. Cl.
G06T 19/00 (2011.01)
G06F 3/01 (2006.01)
G06T 15/00 (2011.01)

(52) U.S. Cl.
CPC ............ *G06T 19/006* (2013.01); *G06F 3/011* (2013.01); *G06T 15/005* (2013.01)

(58) Field of Classification Search
None
See application file for complete search history.

(56) References Cited

U.S. PATENT DOCUMENTS

| 2007/0198183 A1 | 8/2007 | Morimoto et al. |
| 2008/0062008 A1 | 3/2008 | Morimoto et al. |
| 2014/0225920 A1 | 8/2014 | Murata et al. |

FOREIGN PATENT DOCUMENTS

| JP | 2006-7867 A | 1/2006 |
| JP | 2006-35980 A | 2/2006 |

(Continued)

OTHER PUBLICATIONS

Gabbard et al., "Behind the Glass: Driver Challenges and Opportunities for AR Automotive Applications", IEEE, 2014. (Year: 2014).*

(Continued)

*Primary Examiner* — Nicholas R Wilson
(74) *Attorney, Agent, or Firm* — XSENSUS LLP

(57) ABSTRACT

The present technology relates to an information processing device, an information processing method, a program, and a movable object that enable prevention of a user from suffering from motion sickness.
The information processing device includes: a display-position setting unit configured to move, on the basis of the motion of a movable object, the display position of a first picture viewed from a predetermined point of view of the movable object; and a display control unit configured to perform display control based on the display position set. The present technology can be applied to, for example, a vehicle that displays a picture in superimposition on the ambient scenery.

20 Claims, 26 Drawing Sheets

(56) References Cited

FOREIGN PATENT DOCUMENTS

| JP | 2008-242251 A | 10/2008 |
| JP | 2012-19452 A | 1/2012 |
| JP | 2014-153645 A | 8/2014 |
| JP | 2015-141700 A | 8/2015 |
| JP | 2015-184584 A | 10/2015 |
| JP | 2018-76027 A | 5/2018 |

OTHER PUBLICATIONS

International Search Report and Written Opinion dated Oct. 15, 2019, received for PCT Application No. PCT/JP2019/028209, Filed on Jul. 18, 2019, 10 pages including English Translation.

* cited by examiner

INFORMATION PROCESSING DEVICE, INFORMATION PROCESSING METHOD, PROGRAM, AND MOVABLE OBJECT

CROSS-REFERENCE TO RELATED APPLICATIONS

The present application is based on PCT filing PCT/JP2019/028209, filed Jul. 18, 2019, which claims priority to JP 2018-144719, filed Aug. 1, 2018, the entire contents of each are incorporated herein by reference.

TECHNICAL FIELD

The present technology relates to an information processing device, an information processing method, a program, and a movable object. The present technology relates particularly to an information processing device, an information processing method, a program, and a movable object that enable prevention of a user from suffering from motion sickness.

BACKGROUND ART

Until now, proposed has been a technology of deforming, in a case where a picture is displayed on the screen of a display unit provided, for example, at the rear seat of a vehicle or on the ceiling thereof, the shape of the picture for a certain period of time, on the basis of the acceleration, deceleration, right turning, or left turning of the vehicle, to cause a user in the vehicle to sense or predict the motion of the vehicle, resulting in prevention of the user from suffering from motion sickness (for example, refer to Patent Document 1).

Furthermore, if the need for manual driving lessens along with the spread of automated driving in the future, it is conceivable that a picture is projected on the windshield of a vehicle with, for example, a head-up display (HUD) or the like and a user appreciates content, such as a movie, on a large screen in the vehicle.

CITATION LIST

Patent Document

Patent Document 1: Japanese Patent Application Laid-Open No. 2006-35980

SUMMARY OF THE INVENTION

Problems to be Solved by the Invention

However, when the screen increases in size, most of the field of view of the user is covered with the screen, and thus the user has difficulty in sensing the scenery around the vehicle. Thus, the user has difficulty in sensing the motion of the vehicle, resulting in easy induction of motion sickness.

In this regard, in Patent Document 1, because of the premise that a display unit is provided at a rear seat or on a ceiling, the technology has not necessarily been made in sufficient consideration of an increase in the screen size.

The present technology has been made in consideration of such a situation, and an object of the present technology is to enable prevention of a user from suffering from motion sickness.

Solutions to Problems

According to a first aspect of the present technology, provided is an information processing device including: a display-position setting unit configured to move, on the basis of a motion of a movable object, a display position of a first picture viewed from a predetermined point of view of the movable object; and a display control unit configured to perform display control based on the display position set.

According to the first aspect of the present technology, provided is an information processing method to be performed by an information processing device, the information processing method including: moving, on the basis of a motion of a movable object, a display position of a picture viewed from a predetermined point of view of the movable object; and performing display control based on the display position set.

According to the first aspect of the present technology, provided is a program for causing a computer to perform processing including: moving, on the basis of a motion of a movable object, a display position of a picture viewed from a predetermined point of view of the movable object; and performing display control based on the display position set.

According to a second aspect of the present technology, provided is a movable object including: a motion detection unit configured to detect a motion of the movable object; a display-position setting unit configured to move a display position of a picture viewed from a predetermined point of view, on the basis of the motion of the movable object; and a display control unit configured to perform display control based on the display position set.

According to the first aspect of the present technology, on the basis of a motion of a movable object, a display position of a picture viewed from a predetermined point of view of the movable object is moved, and display control based on the display position set is performed.

According to the second aspect of the present technology, a motion of a movable object is detected, a display position of a picture viewed from a predetermined point of view is moved on the basis of the motion of the movable object, and display control based on the display position set is performed.

Effects of the Invention

According to the first or second aspect of the present technology, a user can be prevented from suffering from motion sickness.

Note that the effect herein is not necessarily limitative, and thus any effect in the present disclosure may be provided.

MODE FOR CARRYING OUT THE INVENTION

Modes for carrying out the present technology will be described below. The descriptions will be given in the following order.
1. Exemplary Configuration of Vehicle Control System
2. First Embodiment
3. Second Embodiment
4. Modifications
5. Others

1. Exemplary Configuration of Vehicle Control System

Figure 1:
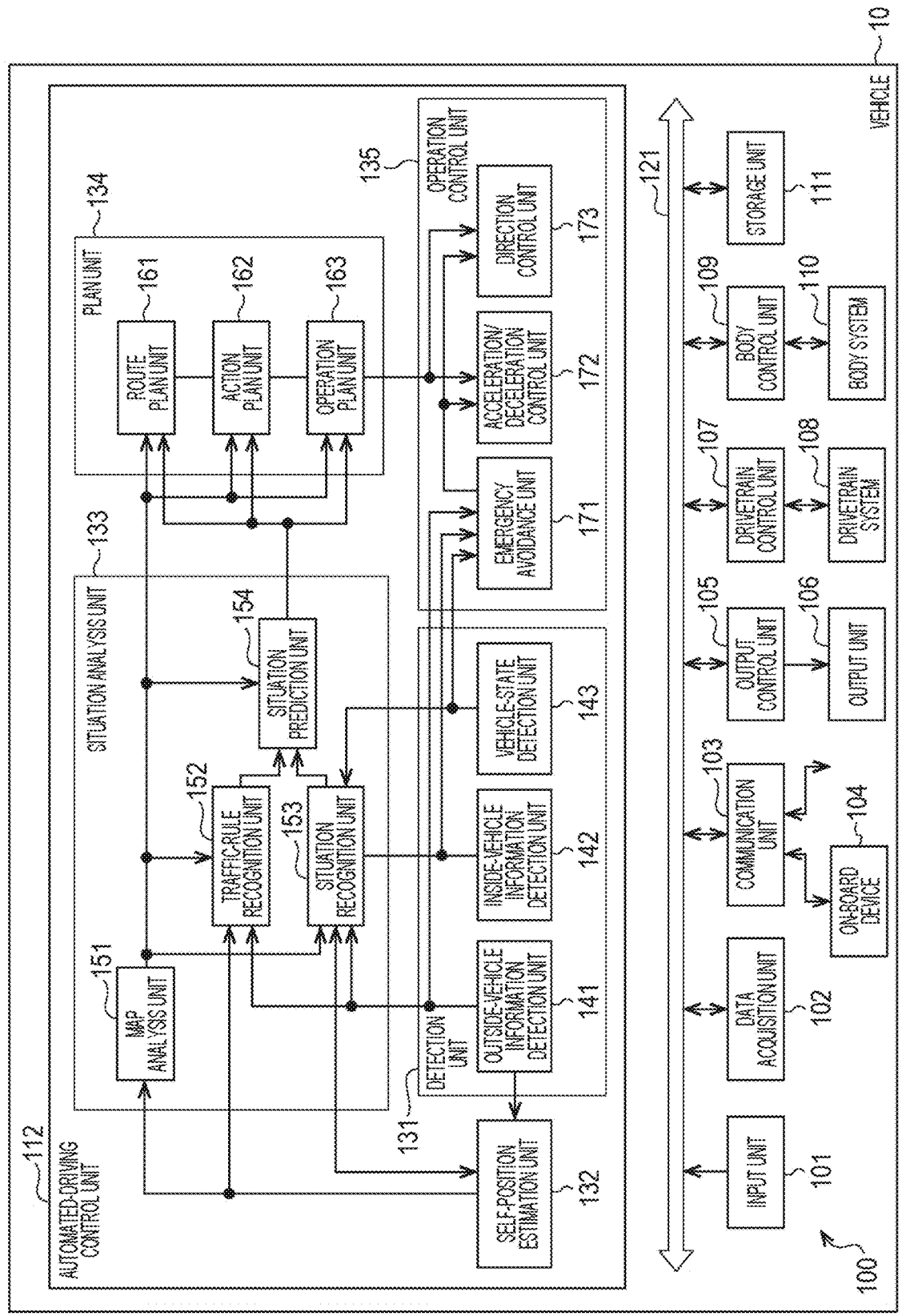
FIG. 1 is a block diagram of an exemplary schematic functional configuration of a vehicle control system to which the present technology can be applied.

FIG. 1 is a block diagram of an exemplary schematic functional configuration of a vehicle control system 100 that is an exemplary movable-object control system to which the present technology can be applied.

The vehicle control system 100 is provided at a vehicle 10 and performs various types of control to the vehicle 10. Note that, in a case where the vehicle 10 is distinguished from another vehicle, the vehicle 10 is referred to as a host car or host vehicle, below.

The vehicle control system 100 includes an input unit 101, a data acquisition unit 102, a communication unit 103, an on-board device 104, an output control unit 105, an output unit 106, a drivetrain control unit 107, a drivetrain system 108, a body control unit 109, a body system 110, a storage unit 111, and an automated-driving control unit 112. The input unit 101, the data acquisition unit 102, the communication unit 103, the output control unit 105, the drivetrain control unit 107, the body control unit 109, the storage unit 111, and the automated-driving control unit 112 are mutually connected through a communication network 121. The communication network 121 includes, for example, an in-vehicle communication network, bus, or the like compliant with a proper standard, such as a controller area network (CAN), a local interconnect network (LIN), a local area network (LAN), or FlexRay (registered trademark). Note that, in some cases, each unit in the vehicle control system 100 is directly connected to the others without the communication network 121.

Note that, in a case where each unit in the vehicle control system 100 performs communication through the communication network 121, the description of the communication network 121 will be omitted below. For example, in a case where the input unit 101 and the automated-driving control unit 112 communicate through the communication network 121, simply the description "the input unit 101 and the automated-driving control unit 112 communicate" will be given.

The input unit 101 includes devices through which an occupant inputs, for example, various types of data or an instruction. For example, the input unit 101 includes operation devices, such as a touch panel, a button, a microphone, a switch, and a lever, and other operation devices capable of accepting inputs with methods, such as by voice and by gesture, different from manual operations. Furthermore, for example, the input unit 101 may be a remote control device with infrared light or other radio waves or may be an external connection device, such as a mobile device or a wearable device adaptable to the operation of the vehicle control system 100. On the basis of, for example, data or an instruction input by the occupant, the input unit 101 generates an input signal and supplies the input signal to each unit in the vehicle control system 100.

The data acquisition unit 102 includes, for example, various types of sensors that acquire data for use in processing in the vehicle control system 100, and supplies the acquired data to each unit in the vehicle control system 100.

For example, the data acquisition unit 102 includes various types of sensors that detect, for example, the state of the vehicle 10. Specifically, for example, the data acquisition unit 102 includes a gyroscope sensor, an acceleration sensor, an inertial measurement unit (IMU), sensors that detect, for example, the manipulated variable of the accelerator pedal, the manipulated variable of the brake pedal, the steering angle of the steering wheel, the number of revolutions of the engine, the number of revolutions of the motor, the rotational speed of the wheels, and the like.

Furthermore, for example, the data acquisition unit 102 includes various types of sensors that detect information outside the vehicle 10. Specifically, for example, the data acquisition unit 102 includes image pickup devices, such as a time-of-flight (ToF) camera, a stereo camera, a monocular camera, an infrared camera, and other cameras. Furthermore, for example, the data acquisition unit 102 includes an environmental sensor that detects weather, atmospheric phenomena, or the like, and an ambient-information detection sensor that detects an object around the vehicle 10. The environmental sensor includes, for example, a raindrops sensor, a fog sensor, an insolation sensor, a snow sensor, and the like. The ambient-information detection sensor includes, for example, an ultrasonic sensor, a radar, light detection and ranging or laser imaging detection and ranging (LiDAR), sonar, and the like.

Moreover, for example, the data acquisition unit 102 includes various types of sensors that detect the current position of the vehicle 10. Specifically, for example, the data acquisition unit 102 includes a global navigation satellite system (GNSS) receiver that receives GNSS signals from GNSS satellites or the like.

Furthermore, for example, the data acquisition unit 102 includes various types of sensors that detect inside-vehicle information or the like. Specifically, for example, the data acquisition unit 102 includes an image pickup device that captures the driver, a biological sensor that detects biological information regarding the driver, a microphone that collects vehicle-interior voice, and the like. The biological sensor is provided, for example, on the top face of a seat, at the steering wheel, or the like, and detects biological information regarding the occupant sitting on the seat or the driver holding the steering wheel.

The communication unit 103 communicates with the on-board device 104, various external devices, a server, a base station, and the like, to transmit data supplied from each unit in the vehicle control system 100 or to supply received data to each unit in the vehicle control system 100. Note that the communication unit 103 is not particularly limited in communication protocol to be supported. Furthermore, the communication unit 103 can support a plurality of types of communication protocols.

For example, the communication unit 103 performs wireless communication with the on-board device 104, with a wireless LAN, Bluetooth (registered trademark), near field communication (NFC), wireless USB (WUSB), or the like. Furthermore, for example, the communication unit 103 performs wired communication with the on-board device 104 through a connection terminal not illustrated (and a cable as necessary) with universal serial bus (USB), high-definition multimedia interface (HDMI) (registered trademark), mobile high-definition link (MHL), or the like.

Moreover, for example, through a base station or an access point, the communication unit 103 communicates with a device (e.g., an application server or a control server) present on an external network (e.g., the Internet, a cloud network, or an enterprise unique network). Furthermore, for example, the communication unit 103 communicates with a terminal (e.g., a pedestrian's terminal, a store's terminal, or a machine type communication (MTC) terminal) present in the neighborhood of the vehicle 10, with peer-to-peer (P2P) technology. Moreover, for example, the communication unit 103 performs V2X communication, such as vehicle-to-vehicle communication, vehicle-to-infrastructure communication, vehicle-to-home communication between the vehicle 10 and home, or vehicle-to-pedestrian communication. Furthermore, for example, the communication unit 103 includes a beacon reception unit, and receives a radio wave or electromagnetic wave from a wireless station or the like installed on a road, to acquire information regarding the current position, traffic congestion, traffic regulation, required time, or the like.

The on-board device 104 includes, for example, an occupant's mobile device or wearable device, an information device that is carried in or mounted on the vehicle 10, a navigation device that performs a search for routes to any destination, and the like.

The output control unit 105 controls output of various types of information to any occupant in the vehicle 10 or outward therefrom. For example, the output control unit 105 generates an output signal including at least either visual information (e.g., image data) or aural information (e.g., voice data) and supplies the output signal to the output unit 106, so that the output unit 106 is controlled so as to output the visual information or the aural information. Specifically, for example, the output control unit 105 combines pieces of image data captured by different image pickup devices included in the data acquisition unit 102 and generates an overhead view image, a panoramic image, or the like. Then, the output control unit 105 supplies an output signal including the generated image to the output unit 106. Furthermore, for example, the output control unit 105 generates voice data including a warning sound, a warning message, or the like against danger, such as collision, contact, or approach to a danger zone, and supplies an output signal including the generated voice data to the output unit 106.

The output unit 106 includes a device capable of outputting visual information or aural information to any occupant in the vehicle 10 or outward therefrom. For example, the output unit 106 includes a display device, an instrument panel, an audio speaker, a headphone, a wearable device, such as an eyewear-type display that an occupant wears, a projector, a lamp, and the like. The display device included in the output unit 106 may be a device having a typical display, a device that displays visual information into the field of view of the driver, or the like, such as a head-up display, a see-through-type display, or a device having a function for augmented-reality (AR) display.

The drivetrain control unit 107 generates various types of control signals and supplies the various types of control signals to the drivetrain system 108, so that the drivetrain system 108 is controlled. Furthermore, the drivetrain control unit 107 supplies, as necessary, a control signal to each unit other than the drivetrain system 108, for example, for notification of the control state of the drivetrain system 108.

The drivetrain system 108 includes various types of devices related to the drivetrain of the vehicle 10. For example, the drivetrain system 108 includes a driving-force generation device that generates the driving force of the internal combustion engine, the driving force of the motor for drive, or the like, a driving-force transmission mechanism of transmitting the driving force to the wheels, a steering mechanism of performing adjustment in rudder angle, a braking device that generates braking force, an antilock brake system (ABS), electronic stability control (ESC), an electric power steering device, and the like.

The body control unit 109 generates various types of control signals and supplies the various types of control signals to the body system 110, so that the body system 110 is controlled. Furthermore, the body control unit 109 supplies, as necessary, a control signal to each unit other than the body system 110, for example, for notification of the control state of the body system 110.

The body system 110 includes various types of body devices with which the body is equipped. For example, the body system 110 includes a keyless entry system, a smart key system, a power window device, a power seat, the steering wheel, an air conditioning device, various types of lamps (e.g., head lamps, rear lamps, brake lamps, blinkers, fog lamps, and the like), and the like.

The storage unit 111 includes, for example, a read only memory (ROM), a random access memory (RAM), a magnetic storage device, such as a hard disc drive (HDD), a semiconductor storage device, an optical storage device, a magneto-optical storage device, and the like. The storage unit 111 stores, for example, various types of programs or data that each unit uses in the vehicle control system 100. For example, the storage unit 111 stores map data including a three-dimensional high-precision map, such as a dynamic map, a global map that is lower in precision than a high-precision map and covers a wide area, a local map including information around the vehicle 10, and the like.

The automated-driving control unit 112 performs control regarding automated driving, such as autonomous traveling or driver assistance. Specifically, for example, the automated-driving control unit 112 performs cooperative control for achievement of the function of an advanced driver assistance system (ADAS) including collision avoidance or impact alleviation of the vehicle 10, follow-up traveling based on inter-vehicle distance, speed-kept traveling, collision warning of the vehicle 10, lane-departure warning of the vehicle 10, and the like. Furthermore, for example, the automated-driving control unit 112 performs cooperative control for automated driving, such as autonomous traveling without the operation of the driver. The automated-driving control unit 112 includes a detection unit 131, a self-position estimation unit 132, a situation analysis unit 133, a plan unit 134, and an operation control unit 135.

The detection unit 131 detects various types of information required for control of automated driving. The detection unit 131 includes an outside-vehicle information detection unit 141, an inside-vehicle information detection unit 142, and a vehicle-state detection unit 143.

The outside-vehicle information detection unit 141 performs detection processing of information outside the vehicle 10, on the basis of data or a signal from each unit in the vehicle control system 100. For example, the outside-vehicle information detection unit 141 performs detection processing, recognition processing, and tracking processing of an object around the vehicle 10, and detection processing of the distance to the object. Examples of objects to be detected include a vehicle, a person, an obstruction, a structure, a road, a traffic light, a traffic sign, a road sign, and the like. Furthermore, for example, the outside-vehicle information detection unit 141 performs detection processing of environment around the vehicle 10. Examples of ambient environments to be detected include weather, temperature, humidity, brightness, the state of a road surface, and the like. The outside-vehicle information detection unit 141 supplies data indicating a result of detection processing to, for example, the self-position estimation unit 132, a map analysis unit 151, a traffic-rule recognition unit 152, and a situation recognition unit 153 in the situation analysis unit 133, and an emergency avoidance unit 171 in the operation control unit 135.

The inside-vehicle information detection unit 142 performs detection processing of inside-vehicle information, on the basis of data or a signal from each unit in the vehicle control system 100. For example, the inside-vehicle information detection unit 142 performs authentication processing and recognition processing of the driver, detection processing of the state of the driver, detection processing of any occupant, detection processing of inside-vehicle environment, and the like. Examples of the state of the driver to be detected include physical condition, the degree of consciousness, the degree of concentration, the degree of fatigue, the direction of line of sight, and the like. Examples of inside-vehicle environments to be detected include temperature, humidity, brightness, smell, and the like. The inside-vehicle information detection unit 142 supplies data indicating a result of detection processing to, for example, the situation recognition unit 153 in the situation analysis unit 133 and the emergency avoidance unit 171 in the operation control unit 135.

The vehicle-state detection unit 143 performs detection processing of the state of the vehicle 10, on the basis of data or a signal from each unit in the vehicle control system 100. Examples of the state of the vehicle 10 to be detected include velocity, acceleration, rudder angle, the presence or absence of abnormality and the detail thereof, the state of operation of driving, the position and inclination of the power seat, the state of door locking, the states of other in-vehicle devices, and the like. The vehicle-state detection unit 143 supplies data indicating a result of detection processing to, for example, the situation recognition unit 153 in the situation analysis unit 133 and the emergency avoidance unit 171 in the operation control unit 135.

The self-position estimation unit 132 performs estimation processing of, for example, the position and posture of the vehicle 10, on the basis of the data or signal from each unit in the vehicle control system 100, such as the outside-vehicle information detection unit 141 and the situation recognition unit 153 in the situation analysis unit 133. Furthermore, the self-position estimation unit 132 generates, as necessary, a local map for use in self-position estimation (hereinafter, referred to as a map for self-position estimation). The map for self-position estimation is a high-precision map with, for example, the technology of simultaneous localization and mapping (SLAM), or the like. The self-position estimation unit 132 supplies data indicating a result of estimation processing to, for example, the map analysis unit 151, the traffic-rule recognition unit 152, and the situation recognition unit 153 in the situation analysis unit 133. Furthermore, the self-position estimation unit 132 stores the map for self-position estimation into the storage unit 111.

The situation analysis unit 133 performs analysis processing of the situation of the vehicle 10 and the situation around the vehicle 10. The situation analysis unit 133 includes the map analysis unit 151, the traffic-rule recognition unit 152, the situation recognition unit 153, and a situation prediction unit 154.

As necessary with the data or signal from each unit in the vehicle control system 100, such as the self-position estimation unit 132 and the outside-vehicle information detection unit 141, the map analysis unit 151 performs analysis processing of various types of maps stored in the storage unit 111 and creates a map including information required for processing of automated driving. The map analysis unit 151 supplies the created map to, for example, the traffic-rule recognition unit 152, the situation recognition unit 153, the situation prediction unit 154, a route plan unit 161, an action plan unit 162, and an operation plan unit 163 in the plan unit 134.

The traffic-rule recognition unit 152 performs recognition processing of the traffic rules around the vehicle 10, on the basis of the data or signal from each unit in the vehicle control system 100, such as the self-position estimation unit 132, the outside-vehicle information detection unit 141, and the map analysis unit 151. Due to this recognition processing, for example, the position and state of any traffic light around the vehicle 10, the detail of traffic regulation around the vehicle 10, any available traffic lane, and the like are recognized. The traffic-rule recognition unit 152 supplies data indicating a result of recognition processing to, for example, the situation prediction unit 154.

The situation recognition unit 153 performs recognition processing of situations regarding the vehicle 10, on the basis of the data or signal from each unit in the vehicle control system 100, such as the self-position estimation unit 132, the outside-vehicle information detection unit 141, the inside-vehicle information detection unit 142, the vehicle-state detection unit 143, and the map analysis unit 151. For example, the situation recognition unit 153 performs recognition processing of the situation of the vehicle 10, the situation around the vehicle 10, the situation of the driver in the vehicle 10, and the like. Furthermore, the situation recognition unit 153 generates, as necessary, a local map for use in recognition of the situation around the vehicle 10 (hereinafter, referred to as a map for situation recognition). The map for situation recognition is, for example, an occupancy grid map.

Examples of the situation of the vehicle 10 to be recognized include the position, posture, and motion of the vehicle 10 (e.g., velocity, acceleration, the direction of movement, and the like), the presence or absence of abnormality and the detail thereof, and the like. Examples of the situation around the vehicle 10 to be recognized include the type and position of an ambient stationary object, the type, position, and motion of an ambient moving object (e.g., velocity, acceleration, the direction of movement, and the like), the configuration of an ambient road, the state of the road surface, and the ambient weather, temperature, humidity, brightness, and the like. Examples of the state of the driver to be recognized include physical condition, the degree of consciousness, the degree of concentration, the degree of fatigue, the motion of line of sight, the operation of driving, and the like.

The situation recognition unit 153 supplies data indicating a result of recognition processing (as necessary, including the map for situation recognition) to, for example, the self-position estimation unit 132 and the situation prediction unit 154. Furthermore, the situation recognition unit 153 stores the map for situation recognition into the storage unit 111.

The situation prediction unit 154 performs prediction processing of situations regarding the vehicle 10, on the basis of the data or signal from each unit in the vehicle control system 100, such as the map analysis unit 151, the traffic-rule recognition unit 152, and the situation recognition unit 153. For example, the situation prediction unit 154 performs prediction processing of the situation of the vehicle 10, the situation around the vehicle 10, the situation of the driver, and the like.

Examples of the situation of the vehicle 10 to be predicted include the behavior of the vehicle 10, occurrence of abnormality, travelable distance, and the like. Examples of the situation around the vehicle 10 to be predicted include the behavior of a moving object, a change in the state of a signal, a change in environment, such as weather, and the like, around the vehicle 10. Examples of the situation of the driver to be predicted include the behavior, physical condition of the driver, and the like.

The situation prediction unit 154 supplies, for example, the route plan unit 161, the action plan unit 162, and the operation plan unit 163 in the plan unit 134, with data indicating a result of prediction processing, together with the respective pieces of data from the traffic-rule recognition unit 152 and the situation recognition unit 153.

The route plan unit 161 plans a route to the destination, on the basis of the data or signal from each unit in the vehicle control system 100, such as the map analysis unit 151 and the situation prediction unit 154. For example, the route plan unit 161 sets a route to the designated destination from the current position, on the basis of the global map. Furthermore, for example, the route plan unit 161 appropriately changes the route, on the basis of situations, such as traffic congestion, accidents, traffic regulation, and construction, the physical condition of the driver, and the like. The route plan unit 161 supplies data indicating the planned route to, for example, the action plan unit 162.

On the basis of the data or signal from each unit in the vehicle control system 100, such as the map analysis unit 151 and the situation prediction unit 154, the action plan unit 162 plans the action of the vehicle 10 for safe traveling in planned time on the route planned by the route plan unit 161. For example, the action plan unit 162 plans starting, stopping, the direction of travel (e.g., forward movement, backward movement, left turning, right turning, changing in direction, and the like), the traffic lane in traveling, the speed of traveling, overtaking, and the like. The action plan unit 162 supplies data indicating the planned action of the vehicle 10 to, for example, the operation plan unit 163.

On the basis of the data or signal from each unit in the vehicle control system 100, such as the map analysis unit 151 and the situation prediction unit 154, the operation plan unit 163 plans the operation of the vehicle 10 for achievement of the action planned by the action plan unit 162. For example, the operation plan unit 163 plans acceleration, deceleration, the locus of traveling, and the like. The operation plan unit 163 supplies data indicating the planned operation of the vehicle 10 to, for example, an acceleration/deceleration control unit 172 and a direction control unit 173 in the operation control unit 135.

The operation control unit 135 controls the operation of the vehicle 10. The operation control unit 135 includes the emergency avoidance unit 171, the acceleration/deceleration control unit 172, and the direction control unit 173.

The emergency avoidance unit 171 performs detection processing of emergency, such as collision, contact, approach to a danger zone, abnormality in the driver, or abnormality in the vehicle 10, on the basis of the respective detection results from the outside-vehicle information detection unit 141, the inside-vehicle information detection unit 142, and the vehicle-state detection unit 143. In a case where occurrence of emergency is detected, the emergency avoidance unit 171 plans the operation of the vehicle 10 for avoidance of emergency, such as sudden stopping or steep turning. The emergency avoidance unit 171 supplies data indicating the planned operation of the vehicle 10 to, for example, the acceleration/deceleration control unit 172 and the direction control unit 173.

The acceleration/deceleration control unit 172 performs acceleration/deceleration control for achievement of the operation of the vehicle 10 planned by the operation plan unit 163 or the emergency avoidance unit 171. For example, the acceleration/deceleration control unit 172 computes a control target value for the driving-force generation device or braking device for achievement of planned acceleration, deceleration, or sudden stopping, and then supplies a control command indicating the computed control target value, to the drivetrain control unit 107.

The direction control unit 173 performs direction control for achievement of the operation of the vehicle 10 planned by the operation plan unit 163 or the emergency avoidance unit 171. For example, the direction control unit 173 computes a control target value for the steering mechanism for achievement of the locus of traveling or steep turning planned by the operation plan unit 163 or the emergency avoidance unit 171, and then supplies a control command indicating the computed control target value, to the drivetrain control unit 107.

2. First Embodiment

Next, a first embodiment of the present technology will be described with reference to FIGS. 2 to 20.

Note that the first embodiment relates mainly to the processing of the data acquisition unit 102, the communication unit 103, the output control unit 105, the output unit 106, the storage unit 111, the detection unit 131, and the self-position estimation unit 132 in the vehicle control system 100 of FIG. 1.

<Exemplary Configuration of Information Processing System 200>

Figure 2:
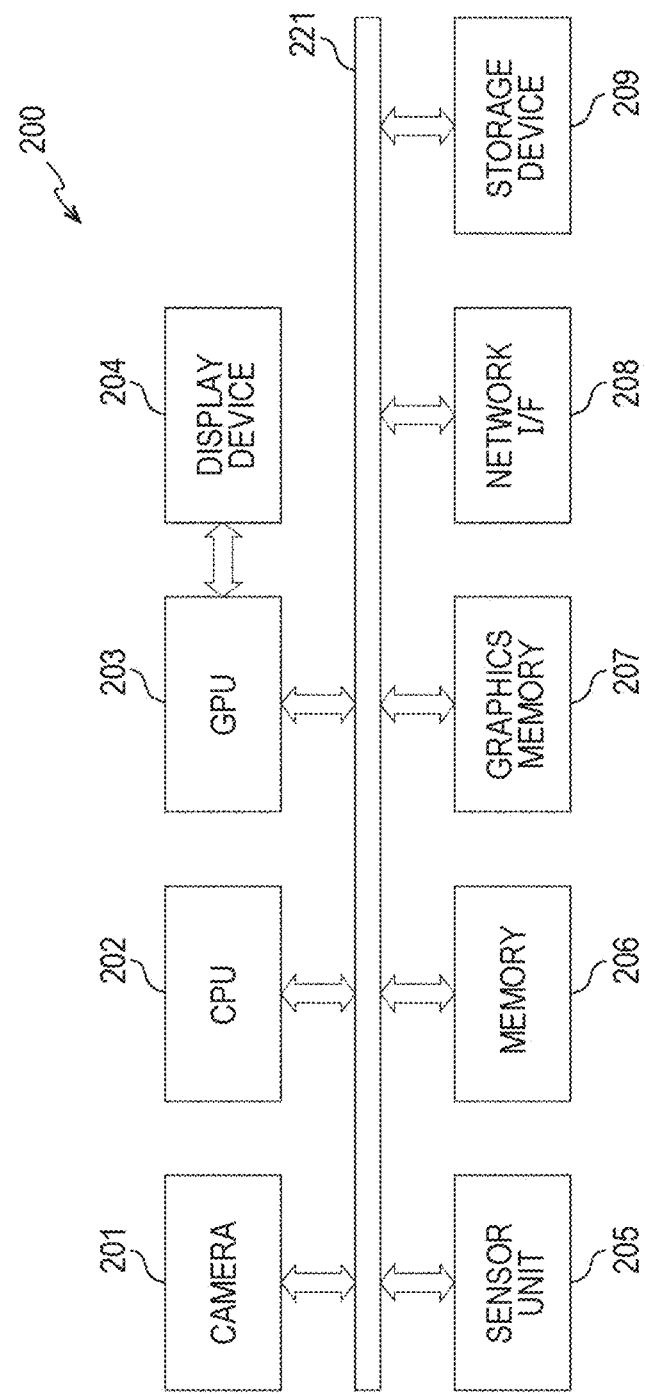
FIG. 2 is a block diagram of an exemplary configuration of an information processing system.

FIG. 2 is a block diagram of an exemplary configuration of an information processing system 200 corresponding to part of the functions achieved by the vehicle control system 100 of FIG. 1.

The information processing system 200 performs, for example, processing of displaying a picture, such as content, to a user in the vehicle 10, or the like.

The information processing system 200 includes a camera 201, a central processing unit (CPU) 202, a graphics processing unit (GPU) 203, a display device 204, a sensor unit 205, a memory 206, a graphics memory 207, a network interface (I/F) 208, and a storage device 209. The camera 201, the CPU 202, the GPU 203, the display device 204, the sensor unit 205, the memory 206, the graphics memory 207, the network I/F 208, and the storage device 209 are mutually connected through a bus 221.

The camera 201 corresponds to, for example, the data acquisition unit 102 of FIG. 1. The camera 201 shoots, for example, the scenery around the vehicle 10 and supplies a shot image to the CPU 202 or the like through the bus 221.

The CPU 202 corresponds to, for example, the output control unit 105, the detection unit 131, and the self-position estimation unit 132 of FIG. 1. The CPU 202 controls each unit in the information processing system 200. Furthermore, the CPU 202 controls the display position of a picture displayed by the display device 204.

The GPU 203 corresponds to, for example, the output control unit 105 of FIG. 1. The GPU 203 performs three-dimensional rendering to a picture that the display device 204 displays.

The display device 204 corresponds to, for example, the output unit 106 of FIG. 1. The display device 204 displays the picture subjected to rendering by the GPU 203, in superimposition on the scenery around the vehicle 10.

Note that a case where the display device 204 displays a picture in superimposition on the scenery ahead of the vehicle 10 around the vehicle 10 will be given below.

Exemplary methods of displaying a picture in superimposition on the scenery ahead of the vehicle 10 by the display device 204 will be given below.

According to a first method, for example, the display device 204 is of a projective type, such as an HUD. Then, the display device 204 projects a picture on the windshield of the vehicle 10, so that the picture is displayed on the windshield. Therefore, the picture is superimposed on the scenery ahead of the vehicle 10 when viewed from inside the vehicle 10.

According to a second method, for example, the display device 204 includes a windshield including a see-through display. Then, the display device 204 electronically makes part of the windshield opaque, and displays a picture in the opaque region. Therefore, the picture is superimposed on the scenery ahead of the vehicle 10 when viewed from inside the vehicle 10.

Note that, according to the first and second methods, the camera 201 can be omitted from the information processing system 200.

According to a third method, for example, the display device 204 includes a windshield including a liquid crystal display (LCD) or an organic light emitting diode (OLED) display or the like. Then, the GPU 203 combines a picture, such as content, into the picture ahead of the vehicle 10 shot by the camera 201, and the display device 204 displays the combined picture. Therefore, the picture is superimposed on the scenery ahead of the vehicle 10.

According to the third method, for substantially real-time reflection of change of the scenery ahead of the vehicle 10, desirably, the time from shooting of the scenery ahead of the vehicle 10 to displaying thereof is made as short as possible.

Note that a case where a picture is displayed on the windshield of the vehicle 10 with the first or second method will be given below.

The sensor unit 205 corresponds to, for example, the data acquisition unit 102 of FIG. 1. The sensor unit 205 detects various types of data for use in detection or prediction of, for example, the motion, position, and orientation of the vehicle 10. For example, the sensor unit 205 detects the velocity, acceleration, current position, steering angle of the vehicle 10, and the like. The sensor unit 205 supplies sensor data acquired in detection processing to, for example, the CPU 202 through the bus 221.

The memory 206 corresponds to, for example, the storage unit 111 of FIG. 1. The memory 206 stores data and a program required for the processing of the information processing system 200. For example, the memory 206 stores a control program that the CPU 202 and the GPU 203 execute. Furthermore, for example, the memory 206 stores various types of data required for the processing of the CPU 202 and the GPU 203.

The graphics memory 207 corresponds to, for example, the storage unit 111 of FIG. 1. The graphics memory 207 stores data of the picture subjected to rendering by the GPU 203.

The network I/F 208 corresponds to, for example, the communication unit 103 of FIG. 1. The network I/F 208 performs external communication to acquire, for example, data of a picture to be displayed by the display device 204. The network I/F 208 stores the acquired data into, for example, the memory 206 or the storage device 209.

The storage device 209 corresponds to, for example, the storage unit 111 of FIG. 1. The storage device 209 includes, for example, a storage medium, such as a magnetic disk, an optical disc, a magneto-optical disc, or a semiconductor memory. The storage device 209 stores, for example, data of a picture to be displayed by the display device 204.

<Exemplary Configuration of Information Processing Unit 251>

Figure 3:
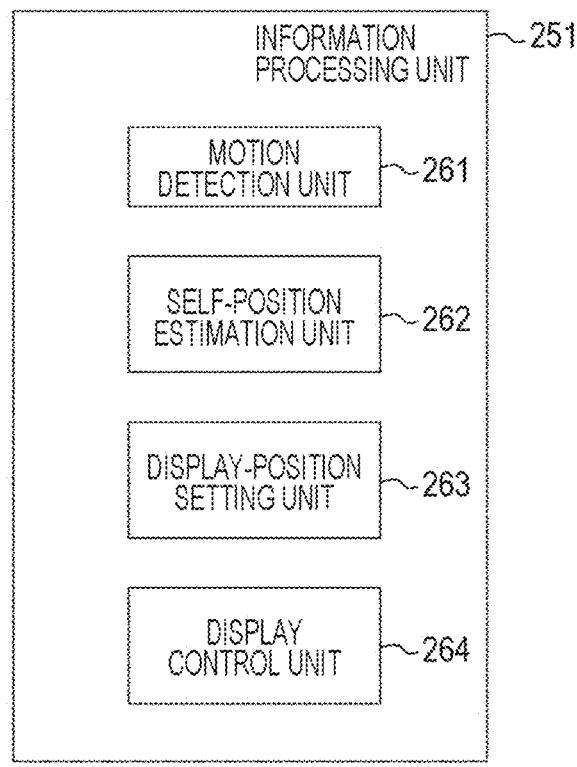
FIG. 3 is a block diagram of an information processing unit according to a first embodiment.

FIG. 3 illustrates an exemplary configuration of an information processing unit 251 achieved, for example, by execution of a predetermined control program by the CPU 202 and the GPU 203 in the information processing system 200 of FIG. 2. The information processing unit 251 includes a motion detection unit 261, a self-position estimation unit 262, a display-position setting unit 263, and a display control unit 264.

The motion detection unit 261 detects the motion of the vehicle 10, on the basis of, for example, sensor data from the sensor unit 205. For example, the motion detection unit 261 detects the velocity, acceleration, and the like of the vehicle 10.

The self-position estimation unit 262 performs self-position estimation to the vehicle 10, on the basis of, for example, sensor data from the sensor unit 205. For example, the self-position estimation unit 262 estimates the position and orientation of the vehicle 10 in the world coordinate system.

The display-position setting unit 263 sets (moves) the position of a virtual screen Sv (FIG. 5), on the basis of the motion of the vehicle 10 (e.g., the acceleration of the vehicle 10). Note that the virtual screen Sv will be described later with reference to FIG. 5. Furthermore, the display-position setting unit 263 sets the position of a picture that the display device 204 displays, on the basis of the position of the virtual screen.

The display control unit 264 controls the display device 204 such that the picture is displayed at the position set by the display-position setting unit 263.

<Display Control Processing>

Next, display control processing that the information processing system 200 performs will be described with reference to the flowchart of FIG. 4.

For example, the processing starts in response to an operation of starting display of a picture, such as content, to the information processing system 200 and finishes in response to an operation of stopping the display of the picture to the information processing system 200.

In step S1, the information processing unit 251 performs initialization in parameter.

Specifically, the motion detection unit 261 initializes velocity vc and acceleration αc of the vehicle 10 to zero. The velocity vc and acceleration αc of the vehicle 10 are expressed by, for example, the components of biaxial directions of the left-and-right direction (x direction) and forward-and-backward direction (y direction) of the vehicle 10. The y direction corresponds to the direction of acceleration/deceleration of the vehicle 10, and the x direction corresponds to the direction of lateral acceleration G at the time of turning movement of the vehicle 10. Note that the respective directions of the velocity vc and acceleration αc of the vehicle 10 are expressed by, for example, the world coordinate system.

The display-position setting unit 263 initializes the velocity vs and acceleration αs of the virtual screen Sv to zero.

Figure 5:
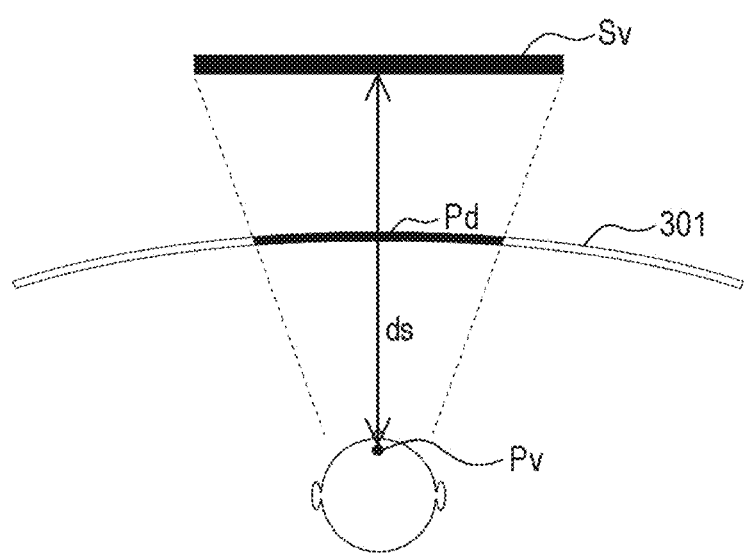
FIG. 5 is an explanatory view of a virtual screen.

Here, the virtual screen Sv will be described briefly with reference to FIG. 5.

For example, in a case where a picture being displayed at a position Pd on the windshield 301 of the vehicle 10 is viewed from a predetermined point of view (hereinafter, referred to as a virtual point of view) Pv in the vehicle 10, the virtual screen Sv is the region in which the picture is recognized virtually. In other words, the virtual screen Sv is the region in which a virtual image is made in a case where the picture being displayed at the position Pd on the windshield 301 is viewed from the virtual point of view Pv.

Note that the position of the virtual point of view Pv may be variable or fixed. In a case where the position of the virtual point of view Pv is variable, for example, the position of the head or eyes of the user in the vehicle 10 is tracked, so that the virtual point of view Pv moves in response to the position of the head or eyes of the user.

An exemplary case where the position of the virtual point of view Pv is fixed will be given below. Furthermore, the distance between the virtual point of view Pv and the virtual screen Sv (hereinafter, referred to as a screen distance) is defined as ds below. Moreover, in some cases, a picture that is virtually recognized in the virtual screen Sv is referred simply to as the virtual screen Sv below.

The velocity vs and acceleration αs of the virtual screen Sv are expressed by, for example, the components of biaxial directions of the direction parallel to and the direction orthogonal to the face of the virtual screen (left-and-right direction) (forward-and-backward direction). Note that the respective directions of the velocity vs and acceleration αs of the virtual screen Sv are expressed by, for example, the world coordinate system.

In step S2, the self-position estimation unit 262 updates the position and orientation of the vehicle 10.

For example, the self-position estimation unit 262 updates the position of the vehicle 10, on the basis of the most recent position of the vehicle 10 and the current velocity vc and acceleration αc of the vehicle 10.

Here, the acceleration $\alpha c_x$ in the x-axis direction of the vehicle 10 corresponds to the lateral acceleration G at the time of turning of the vehicle 10. Thus, after acquiring the velocity $vc_y$ in the y-axis direction of the vehicle 10, the self-position estimation unit 262 calculates, on the basis of the acceleration $\alpha c_x$, the radius of curvature R of turning movement of the vehicle 10, with the following Expression (1).

$$R = vc_y^2 / \alpha c_x \tag{1}$$

Then, the self-position estimation unit 262 updates the orientation of the vehicle 10, on the basis of the most recent orientation of the vehicle 10, the current velocity vc and acceleration αc of the vehicle 10, and the radius of curvature R.

Note that the position and orientation of the vehicle 10 are expressed by, for example, the world coordinate system.

In step S3, the display-position setting unit 263 performs updating in display position.

For example, the display-position setting unit 263 updates the position and orientation of the virtual screen Sv, on the basis of the most recent position and orientation of the virtual screen Sv and the current velocity vs and acceleration αs of the virtual screen Sv, in a manner similar to that of the vehicle 10. Note that the position and orientation of the virtual screen Sv are expressed by, for example, the world coordinate system.

Here, the position and orientation of the virtual screen Sv are set on the basis of the velocity vs and acceleration αs of the virtual screen Sv, regardless of the velocity Vc and acceleration αc of the vehicle 10. Therefore, in a case where the velocity vc of the vehicle 10 and the velocity vs of the virtual screen Sv are in agreement and the acceleration αc of the vehicle 10 and the acceleration αs of the virtual screen Sv are in agreement, the position and orientation of the virtual screen Sv do not vary to the virtual point of view Pv. Meanwhile, in a case where disagreement is obtained at least either between the velocity vc of the vehicle 10 and the velocity vs of the virtual screen Sv or between the acceleration αc of the vehicle 10 and the acceleration αs of the virtual screen Sv, at least either the position or orientation of the virtual screen Sv varies to the virtual point of view Pv.

Note that, at the beginning of the processing in step S3, the virtual screen Sv is set to a home position. Here, the home position is a predetermined reference position of the virtual screen Sv. The virtual screen Sv moves on the basis of the home position.

Figure 6:
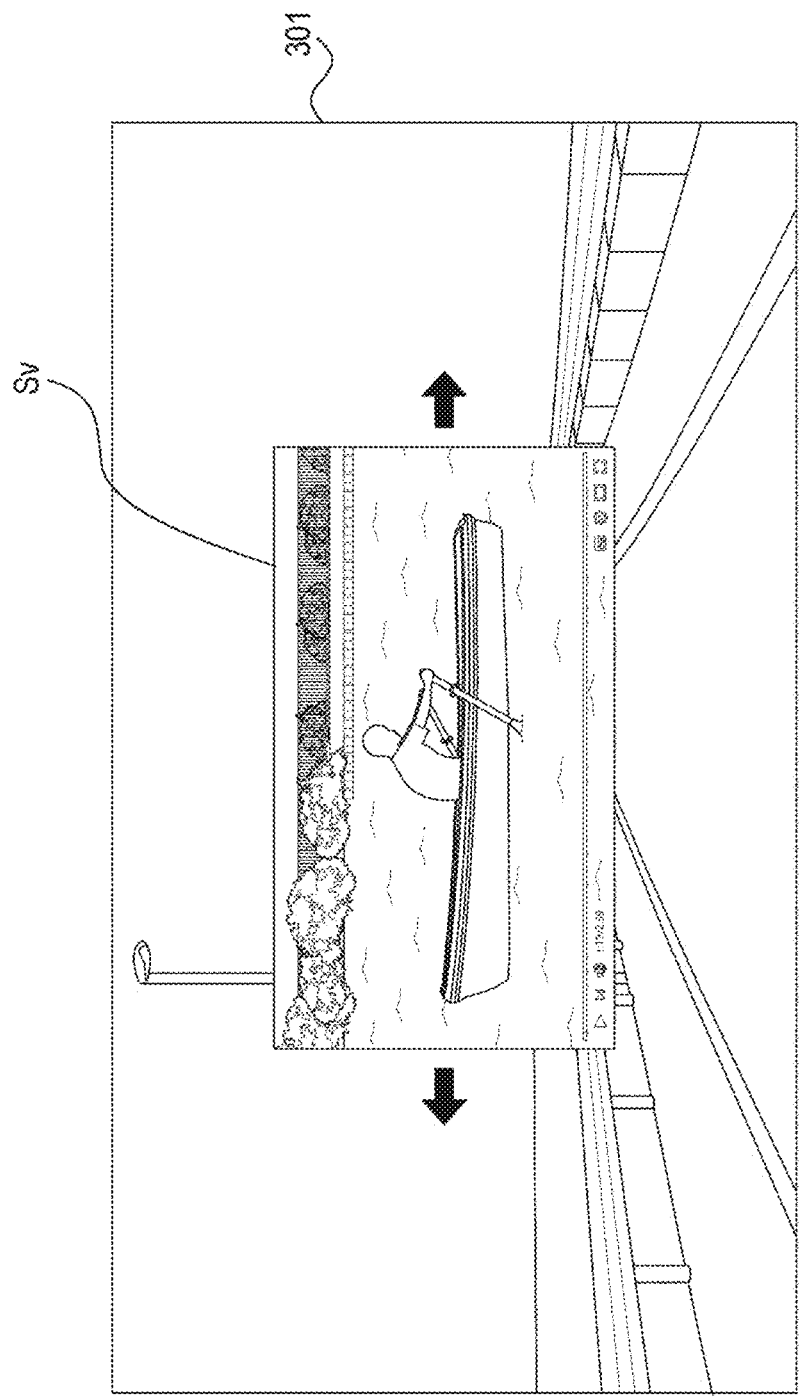
FIG. 6 is an explanatory view of a home position.

FIG. 6 schematically illustrates an exemplary position of the virtual screen Sv viewed from the virtual point of view Pv in a case where the virtual screen Sv is set to the home position.

The home position is set, for example, on the basis of the virtual point of view Pv. For example, the screen distance ds between the virtual point of view Pv and the virtual screen Sv is set at a predetermined initial value ds0 (hereinafter, referred to as a standard distance ds0). Furthermore, the orientation of the virtual screen Sv (direction of the normal vector to the face of the virtual screen Sv) is set facing to the vehicle 10, namely, facing in the backward direction of the vehicle 10 (direction inverse to the forward direction).

Furthermore, the virtual screen Sv is fixed to a predetermined size. For example, as illustrated in FIG. 6, in case where the virtual screen Sv is set to the home position, the size of the virtual screen Sv is set such that the height and width of the virtual screen Sv viewed from the virtual point of view Pv are approximately halves of the height and width of the windshield 301, respectively.

Therefore, for example, as illustrated in FIG. 6, the virtual screen Sv is disposed at substantially the center of the windshield 301 when viewed from the virtual point of view Pv. That is, the home position of the virtual screen Sv is at substantially the center front of the vehicle 10 when viewed from the virtual point of view Pv.

Because the current position and posture of the vehicle 10 are known, the display-position setting unit 263 calculates the position and orientation of the virtual screen Sv set to the home position, on the basis of the current position and posture of the vehicle 10.

Here, as the screen distance ds shortens, the virtual screen Sv comes closer to the virtual point of view Pv, resulting in an increase in the size of the virtual screen Sv viewed from the virtual point of view Pv. Meanwhile, as the screen distance ds lengthens, the virtual screen Sv moves farther from the virtual point of view Pv, resulting in a decrease in the size of the virtual screen Sv viewed from the virtual point of view Pv.

Furthermore, as the absolute value of the orientation of the virtual screen Sv to the y axis of the vehicle 10 (forward-and-backward direction of the vehicle 10) (hereinafter, referred to as a screen angle θs) decreases, the virtual screen Sv comes closer to the front of the vehicle 10. Meanwhile, as the absolute value of the screen angle θs increases, the virtual screen Sv moves from the front of the vehicle 10 to left or right.

Note that, for the screen angle θs, the clockwise and counterclockwise directions about the virtual point of view Pv are defined as positive and negative, respectively, below.

Furthermore, the display-position setting unit 263 calculates the screen distance ds and the screen angle θs, on the basis of the position and orientation of the vehicle 10 and the position and orientation of the virtual screen Sv. Then, the display-position setting unit 263 calculates the display position Pd for a picture on the windshield 301 corresponding to the virtual screen Sv, on the basis of the screen distance ds and the screen angle θs.

Here, the picture is displayed at the display position Pd, so that the picture is recognized at the position of the virtual screen Sv when viewed from the virtual point of view Pv. That is, a virtual image corresponding to the picture on the windshield 301, is formed at the position of the virtual screen Sv.

Note that the concept of the display position Pd of the picture includes not only the position at which the picture is displayed but also the shape of the picture (shape and size).

For example, the virtual screen Sv viewed from the virtual point of view Pv varies in size depending on the screen distance ds and varies in shape depending on the screen angle θs. Thus, the shape of the display position Pd is set in consideration of such variations.

In step S4, the display-position setting unit 263 determines whether or not the virtual screen Sv has reached the boundary.

For example, in a case where the screen distance ds has reached a predetermined minimum value, the display-position setting unit 263 determines that the virtual screen Sv has reached the boundary. This case is that the virtual screen Sv is viewed largest, closest to the vehicle 10.

Furthermore, for example, in a case where the screen distance ds has reached a predetermined maximum value, the display-position setting unit 263 determines that the virtual screen Sv has reached the boundary. This case is, for example, that the virtual screen Sv is viewed smallest, farthest from the vehicle 10.

Moreover, for example, in a case where the absolute value of the screen angle θs has reached a predetermined maximum value, the display-position setting unit 263 determines that the virtual screen Sv has reached the boundary. This case is, for example, that the virtual screen Sv has reached the left end or right end of the windshield 301 when viewed from the virtual point of view Pv.

Then, in a case where it is determined in step S4 that the virtual screen Sv has reached the boundary, the processing proceeds to step S5.

In step S5, the display-position setting unit 263 resets the velocity and acceleration of the virtual screen Sv. Specifically, the display-position setting unit 263 sets the velocity vs of the virtual screen Sv at the current velocity vc of the vehicle 10 and sets the acceleration αs of the virtual screen Sv at the current acceleration αc of the vehicle 10.

Therefore, the virtual screen Sv takes the same motion as the vehicle 10 does, so that the virtual screen Sv is prevented from moving out of the boundary.

After that, the processing proceeds to step S6.

Meanwhile, in a case where it is determined in step S4 that the virtual screen Sv has not reached the boundary, the processing proceeds to step S6 with the processing in step S5 skipped. That is, the velocity vs and acceleration αs of the virtual screen Sv remain unchanged, regardless of the velocity vc and acceleration αc of the vehicle 10.

In step S6, the display control unit 264 performs rendering to the picture. Specifically, the display control unit 264 forms, on the graphics memory 207, data for displaying the picture at the display position Pd calculated by the display-position setting unit 263.

In step S7, the display control unit 264 stands by for display updating. That is, the display control unit 264 stands by until the picture based on the data formed in the graphics memory 207 is displayed on the windshield 301. Then, when the picture based on the data formed in the graphics memory 207 is displayed on the windshield 301, the processing proceeds to step S8.

In step S8, the information processing unit 251 performs updating in parameter.

Specifically, for example, the motion detection unit 261 updates the velocity vc and acceleration αc of the vehicle 10, on the basis of sensor data from the sensor unit 205.

The display-position setting unit 263 updates the velocity vs of the virtual screen Sv, with the following Expression (2).

$$vs = vs + \alpha s \times \Delta t \qquad (2)$$

where Δt represents the elapsed time after most recent updating of the velocity vs.

Furthermore, the display-position setting unit 263 updates the acceleration αs of the virtual screen, with the following Expression (3).

$$\alpha s = \alpha s + Kp1 \times \Delta p - Kp2 \times \Delta v \quad (3)$$

where Δp represents the difference between the current position of the virtual screen Sv and the home position, namely, the displacement of the virtual screen Sv from the home position. Δv represents the difference in velocity between the virtual screen Sv and the vehicle 10, resulting from subtraction of the velocity vc of the vehicle 10 from the velocity vs of the virtual screen Sv. Kp1 and Kp2 each represent a predetermined coefficient.

Due to the second term (Kp1×ΔP) in Expression (3), the component of the acceleration αs of the virtual screen Sv in the direction in which the virtual screen Sv returns to the home position increases. The amount of increase rises as the displacement Δp increases. The amount of increase drops as the displacement Δp decreases. That is, as the virtual screen Sv moves farther from the home position, the acting force of returning the virtual screen Sv to the home position strengthens. As the virtual screen Sv comes closer to the home position, the acting force of returning the virtual screen Sv to the home position weakens.

Therefore, even after the virtual screen Sv moves from the home position due to, for example, acceleration, deceleration, or turning of the vehicle 10, when the vehicle 10 moves forward at constant velocity (travels straight in the forward direction), the virtual screen Sv returns to the home position, eventually.

Meanwhile, due to the third term (−Kp1×ΔP) in Expression (3), the component of the acceleration αs of the virtual screen Sv in the direction in which the virtual screen Sv returns to the home position decreases. The amount of decrease rises as the difference in velocity Δv increases. The amount of decrease drops as the difference in velocity Δv decreases. Therefore, the velocity of the virtual screen Sv in the direction in which the virtual screen Sv returns to the home position, is inhibited from being excessive due to the function of the second term in Expression (3).

Note that the coefficients Kp1 and Kp2 are adjusted such that the user hardly senses the acceleration of the virtual screen Sv viewed from the virtual point of view Pv.

Furthermore, the third term in Expression (3) can be omitted as necessary.

After that, the processing goes back to step S2, and then the processing in steps S2 to S8 is repeatedly performed.

Here, specific exemplary motions of the virtual screen Sv in the above processing will be described with reference to FIGS. 7 to 20.

<Case where Vehicle 10 Turns>

First, the motion of the virtual screen Sv in a case where the vehicle 10 turns will be described with reference to FIGS. 7 to 13. More specifically, the motion of the virtual screen Sv in a case where the vehicle 10 turns left.

Figure 7:
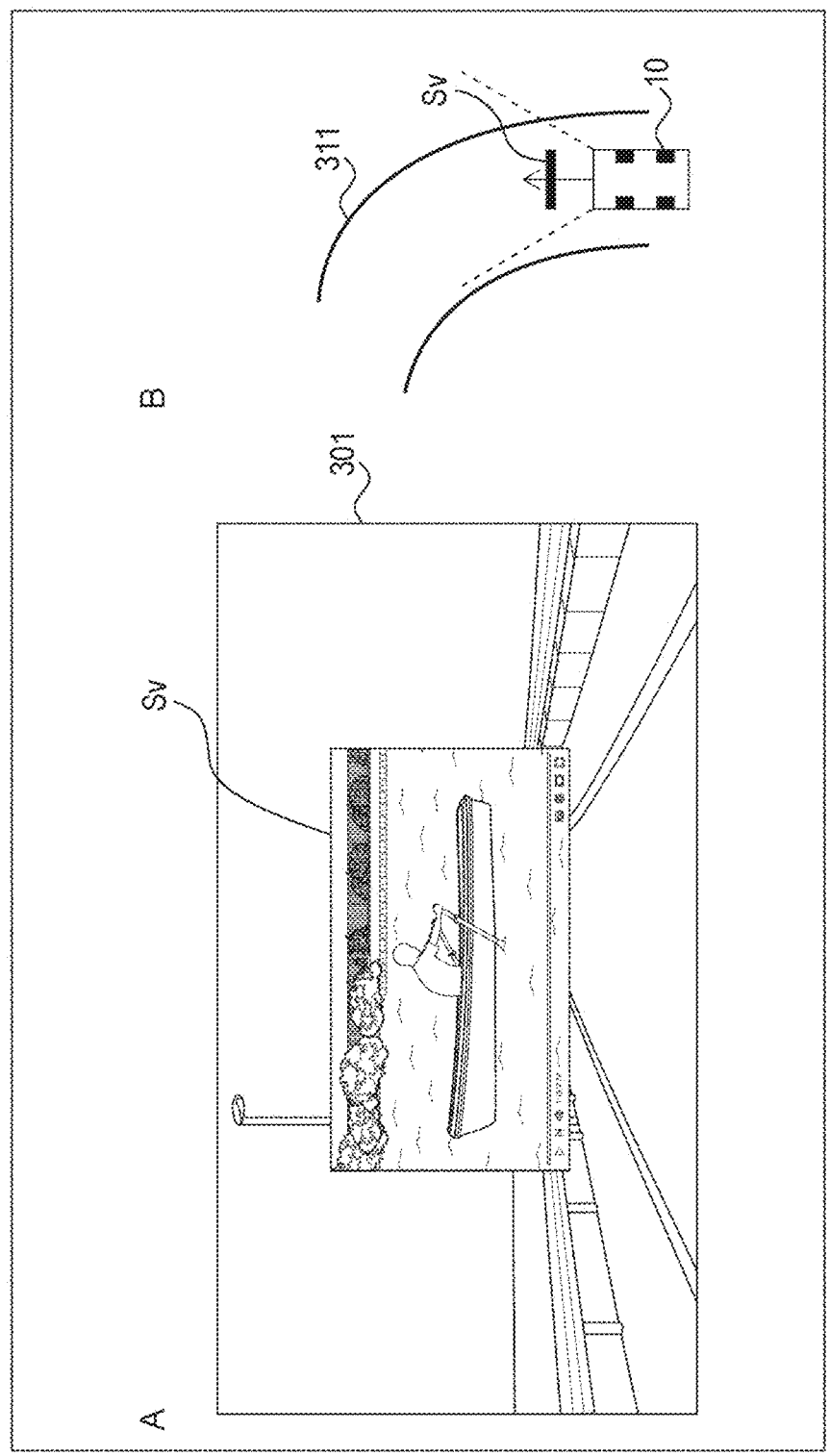
FIG. 7 illustrates an exemplary motion of the virtual screen in a case where a vehicle turns.

A of FIG. 7 illustrates an exemplary position of the virtual screen Sv while the vehicle 10 is traveling straight at constant velocity before turning along a curve 311, as illustrated in B of FIG. 7. In this case, the virtual screen Sv is set to the home position.

Figure 8:
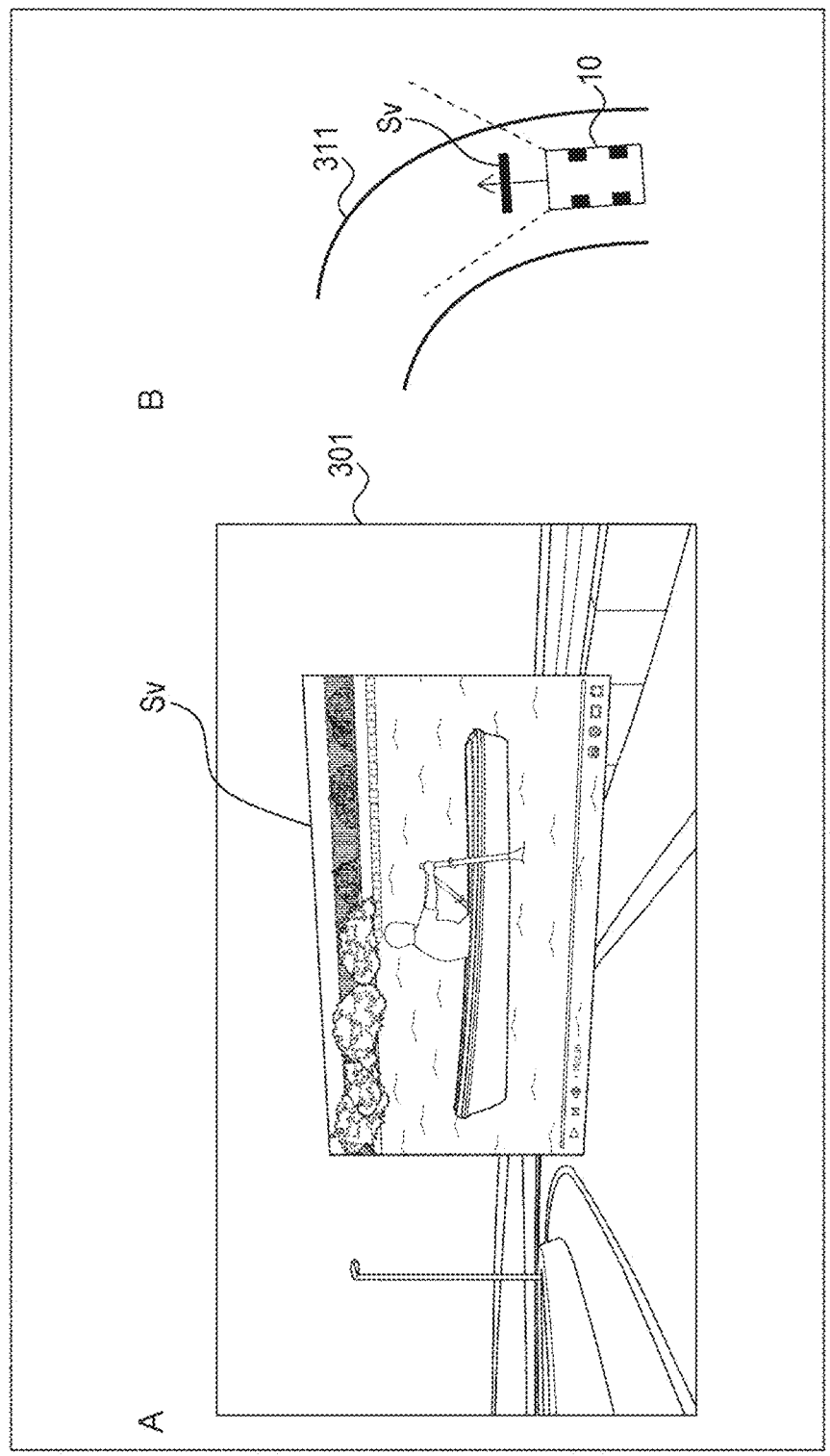
FIG. 8 illustrates an exemplary motion of the virtual screen in a case where the vehicle turns.

A of FIG. 8 illustrates an exemplary position of the virtual screen Sv when the vehicle 10 starts turning left along the curve 311, as illustrated in B of FIG. 8. Whereas the vehicle 10 turns left, the virtual screen Sv travels straight without much variation in velocity and direction. Therefore, the virtual screen Sv starts pivoting right along with the left turning of the vehicle 10 when viewed from the virtual point of view Pv. Furthermore, the virtual screen Sv accelerates in the direction inverse to the vehicle 10 when viewed from the virtual point of view Pv. Moreover, the orientation of the virtual screen Sv slants to the front of the vehicle 10, so that the virtual screen Sv deforms in shape. Specifically, the virtual screen Sv is of a substantially sideways trapezoid lowering in height toward left.

Figure 9:
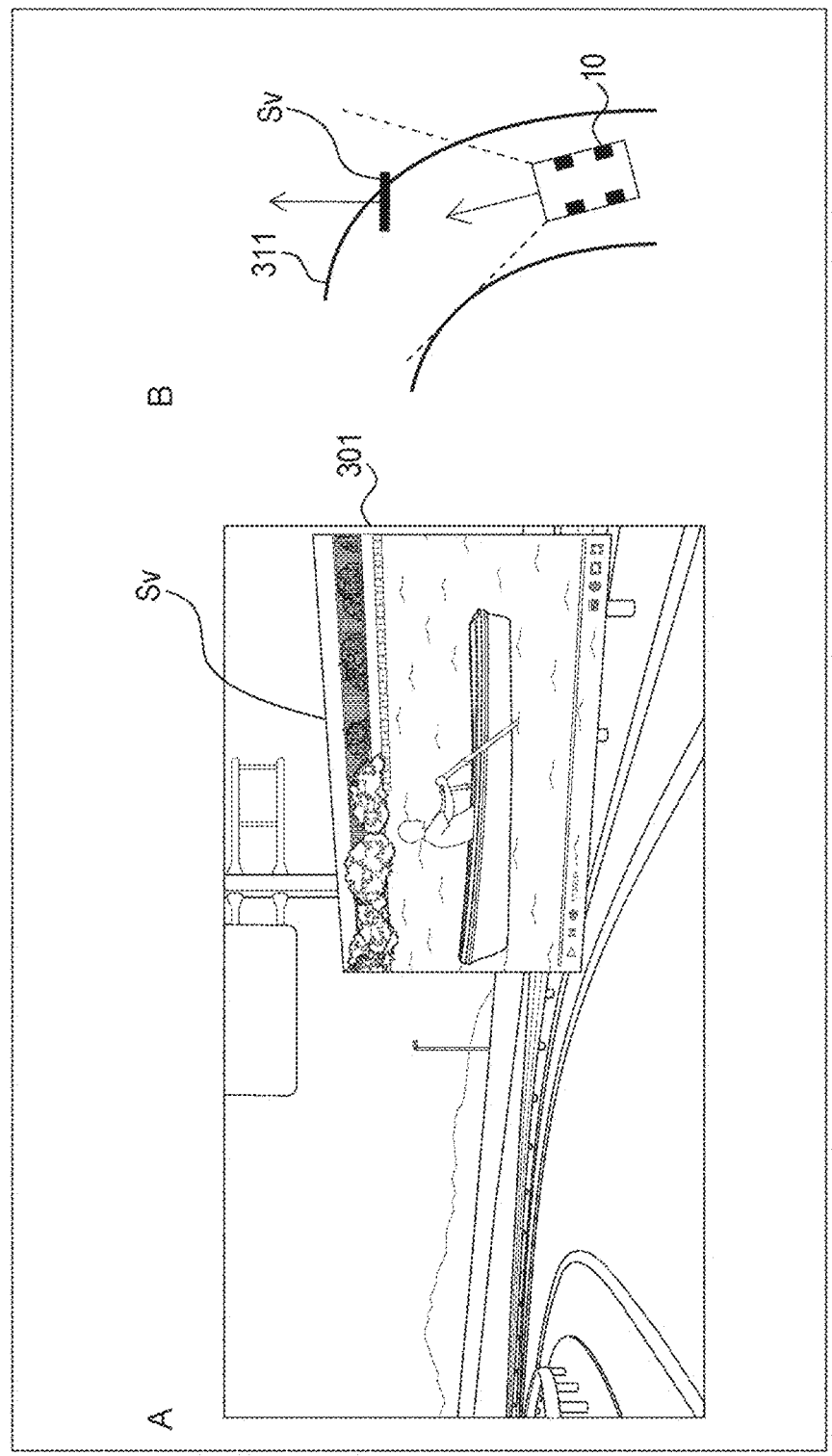
FIG. 9 illustrates an exemplary motion of the virtual screen in a case where the vehicle turns.

A of FIG. 9 illustrates an exemplary position of the virtual screen Sv when the vehicle 10 further turns left along the curve 311, as illustrated in B of FIG. 9. Whereas the vehicle 10 turns left, the virtual screen Sv travels straight without much variation in velocity and direction. Therefore, the virtual screen Sv further pivots right along with the left turning of the vehicle 10 when viewed from the virtual point of view Pv. Furthermore, the virtual screen Sv accelerates in the direction inverse to the vehicle 10 when viewed from the virtual point of view Pv. Therefore, the virtual screen Sv has reached the right end of the windshield 301. Moreover, the orientation of the virtual screen Sv further slants to the front of the vehicle 10, so that the trapezoid shape of the virtual screen Sv further deforms.

Here, the time for the virtual screen Sv to reach from the home position to the right end of the windshield 301 will be described with reference to FIGS. 10 and 11.

In a case where the vehicle 10 turns left along an arc, the angle of turning of the vehicle 10 is substantially equal to the angle of movement of the virtual screen Sv from the home position to right. The angle ω is acquired, for example, with the following Expression (4).

$$\omega = 360° \times vc \times t \div 2\pi R \quad (4)$$

where t represents the elapsed time (in units of seconds) after the vehicle 10 starts turning. R represents the radius of curvature (in units of m) of the curve along which the vehicle 10 turns.

Figure 10:
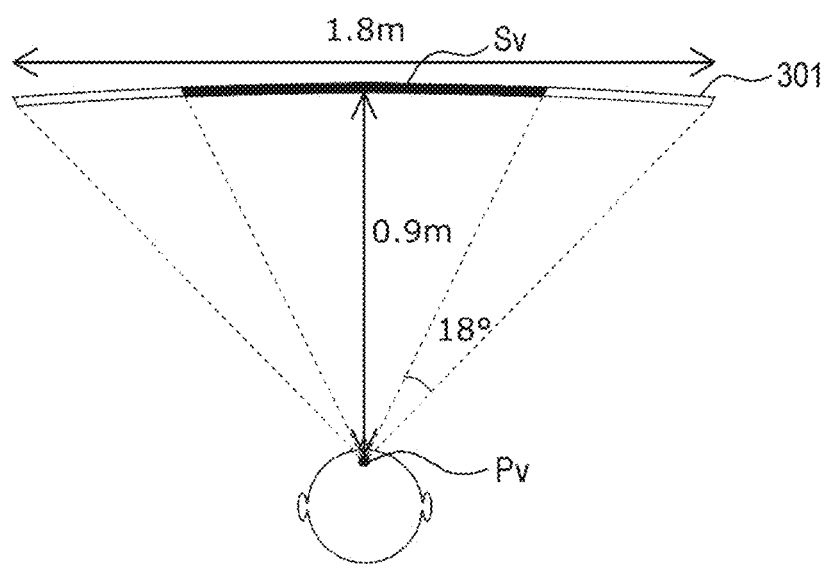
FIG. 10 is an explanatory view of the time for the virtual screen to reach the right end of a windshield.

For example, as illustrated in FIG. 10, examined will be a case where the windshield 301 has a width of 1.8 m, the distance between the virtual point of view Pv and the windshield 301 is 0.9 m, and the virtual screen Sv accounts in width for 50 percent of the windshield 301 when viewed from the virtual point of view Pv.

In this case, when pivoting from the home position to right by approximately 18°, the virtual screen Sv reaches the right end of the windshield 301. Therefore, the relationship between the velocity vc of the vehicle 10, the radius of curvature R of the curve, and the time for the virtual screen Sv to reach the right end of the windshield 301 is given as illustrated in FIG. 11.

Figure 11:
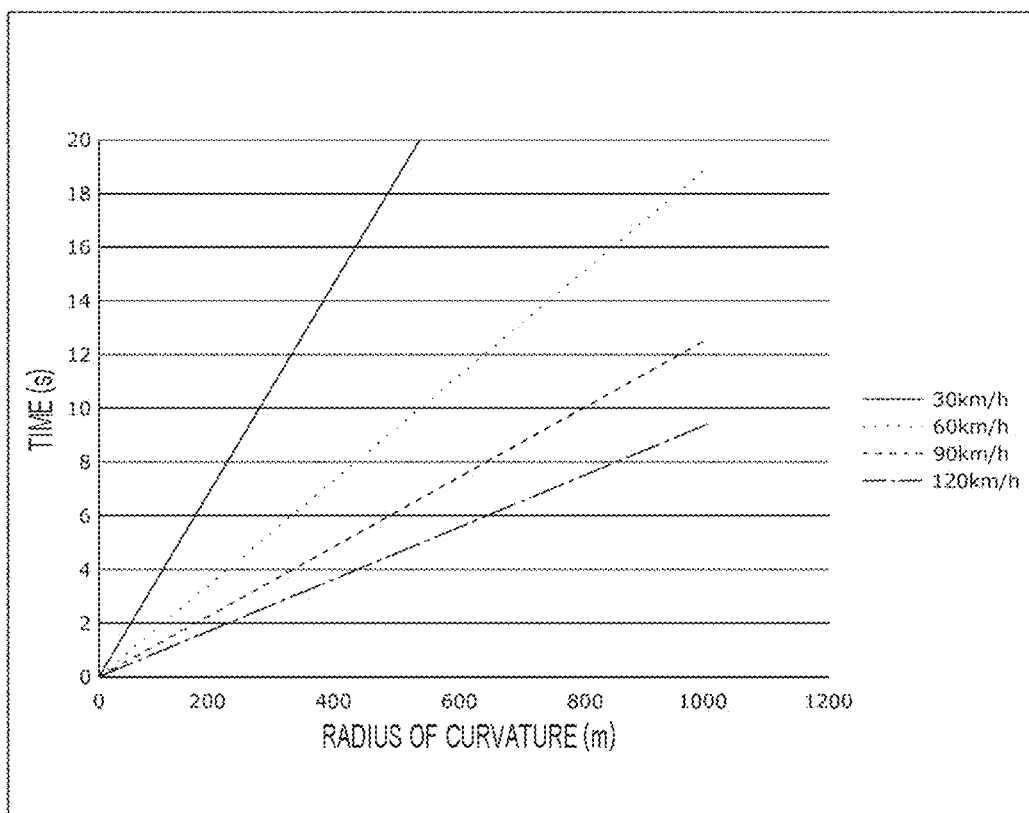
FIG. 11 is a graph of the relationship between the radius of curvature of a curve and the time for the virtual screen to reach the right end of the windshield.

The horizontal axis of FIG. 11 represents the radius of curvature R (in units of m) of the curve, and the vertical axis of FIG. 11 represents the time (in units of seconds) for the virtual screen Sv to reach the right end of the windshield 301. Furthermore, FIG. 11 is a graph with the velocity vc of the vehicle 10 varying, such as 30, 60, 90, and 120 km/h.

As indicated in the graph, as the velocity vc of the vehicle 10 rises, the time for the virtual screen Sv to reach the right end of the windshield 301 shortens. Furthermore, as the radius of curvature R of the curve increases, the time for the virtual screen Sv to reach the right end of the windshield 301 lengthens.

If the virtual screen Sv continues to take similar motion even after reaching the left end or right end of the windshield 301, the virtual screen Sv moves out of the windshield 301, resulting in being invisible to the user. Furthermore, even if the virtual screen SV is stopped at the left end or right end of the windshield 301, the virtual screen Sv deteriorates in visibility.

Thus, as described above, when the virtual screen Sv reaches the left end or right end of the windshield 301, the velocity vs and acceleration αs of the virtual screen Sv are temporarily reset so as to be equal to the velocity and acceleration of the vehicle 10. In addition, the virtual screen Sv accelerates in the direction in which the virtual screen Sv returns to the home position.

Figure 12:
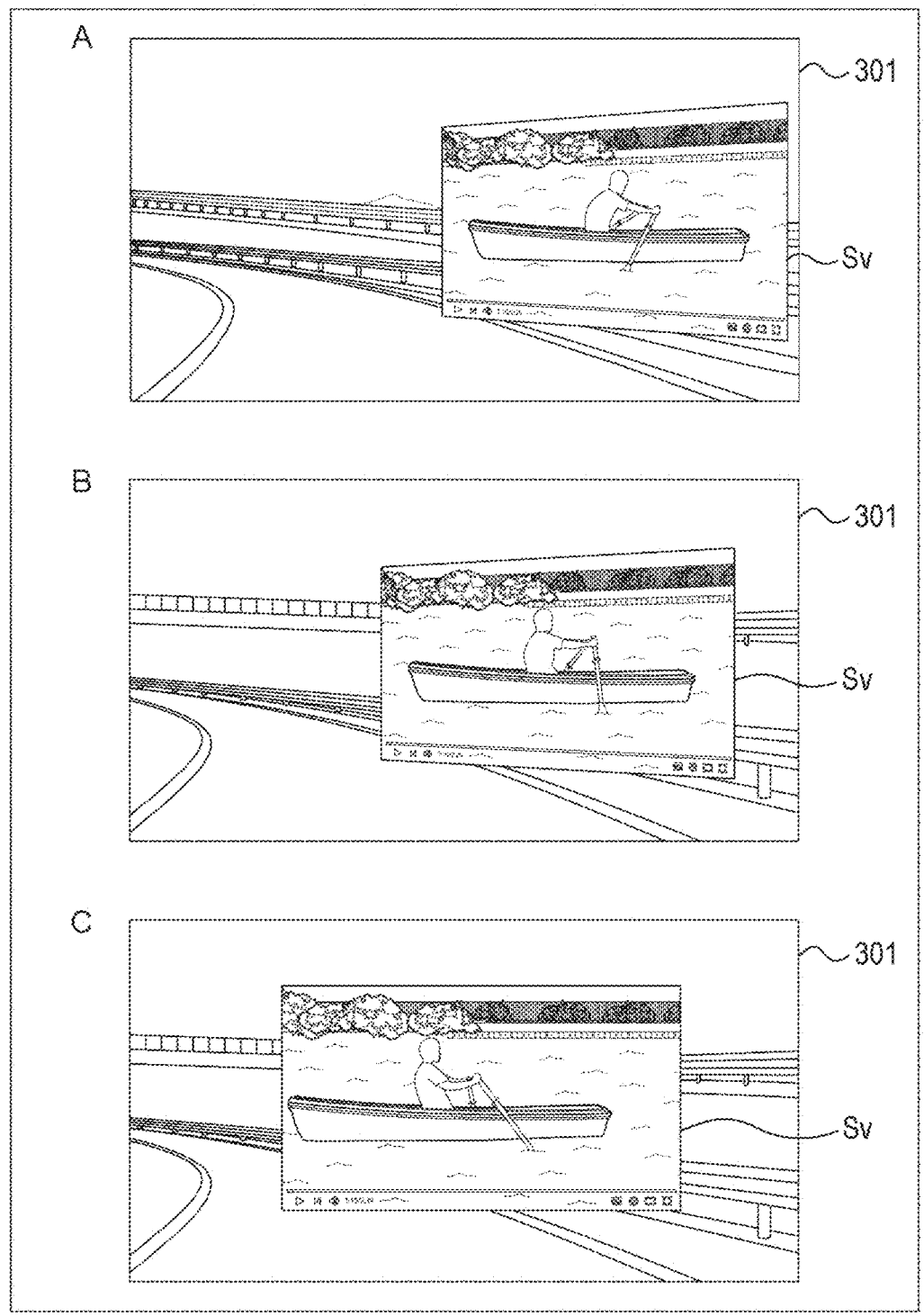
FIG. 12 illustrates, explanatorily, the motion of the virtual screen after the virtual screen reaches the right end of the windshield.

Therefore, for example, as illustrated in A to C of FIG. 12, the virtual screen Sv pivots from the right end of the windshield 301 to left, and returns to the home position, eventually.

However, the motion of the virtual screen Sv returning to the home position causes the user to sense acceleration different from the motion of the vehicle 10. Thus, motion sickness is likely to be induced. Therefore, the virtual screen Sv returns gradually to the home position such that the acceleration is not much sensed.

For example, the lateral acceleration G of the virtual screen Sv when viewed from the virtual point of view Pv is inhibited from exceeding a predetermined threshold (e.g., 0.1 G). That is, when the angular velocity of the virtual screen Sv at the time when returning to the home position is defined as co (in units of rad/s) and the threshold is defined as 0.1 G, the angular velocity ω is set such that the following Expression (5) is satisfied.

$$R\omega^2 \leq 0.1 \times 9.8 \tag{5}$$

For example, in the example of FIG. 10 described above, the virtual screen Sv needs to pivot left by approximately 18° so that the virtual screen Sv returns from the right end of the windshield 301 to the home position.

Meanwhile, in a case where the radius of curvature R of the curve 311 is 50 m, Expression (5) results in co 0.14 (rad/s). Therefore, in a case where the angular velocity ω of the virtual screen Sv is set at 0.14 (rad/s), the time required for the virtual screen Sv to return to the home position is approximately 2.2 seconds.

Figure 13:
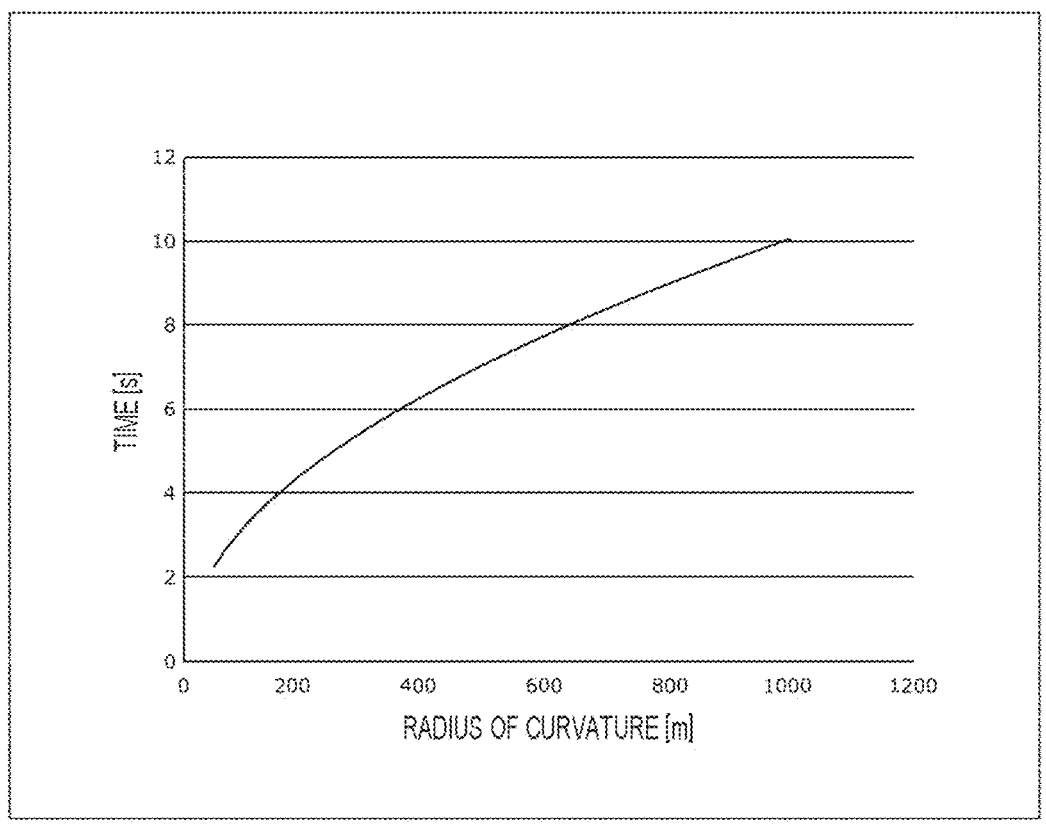
FIG. 13 is a graph of the relationship between the radius of curvature of a curve and the required time for the virtual screen to return to the home position.

FIG. 13 exemplifies the time required for the virtual screen Sv to return from the left end or right end of the windshield 301 to the home position in a case where the lateral acceleration G of the virtual screen Sv is set at 0.1 G under the condition illustrated in FIG. 10. The horizontal axis of FIG. 13 represents the radius of curvature (in units of m) of the curve along which the vehicle 10 is turning, and the vertical axis of FIG. 13 represents the required time (in units of seconds) for the virtual screen Sv to return to the home position.

As described above, as the radius of curvature of the curve along which the vehicle 10 is turning increases, the required time lengthens. As the radius of curvature decreases, the required time shortens.

Furthermore, although no specific illustration is given, as the range of movement in the left-and-right direction of the virtual screen Sv widens and the angle of movement thereof increases, the required time for the virtual screen Sv to return to the home position lengthens. Meanwhile, as the range of movement in the left-and-right direction of the virtual screen Sv narrows and the angle of movement thereof decreases, the required time for the virtual screen Sv to return to the home position shortens.

<Case where Vehicle 10 Accelerates>

Next, the motion of the virtual screen Sv in a case where the vehicle 10 accelerates will be described with reference to FIGS. 14 to 17. More specifically, the motion of the virtual screen Sv in a case where the vehicle 10 accelerates while traveling straight forward will be described.

Figure 14:
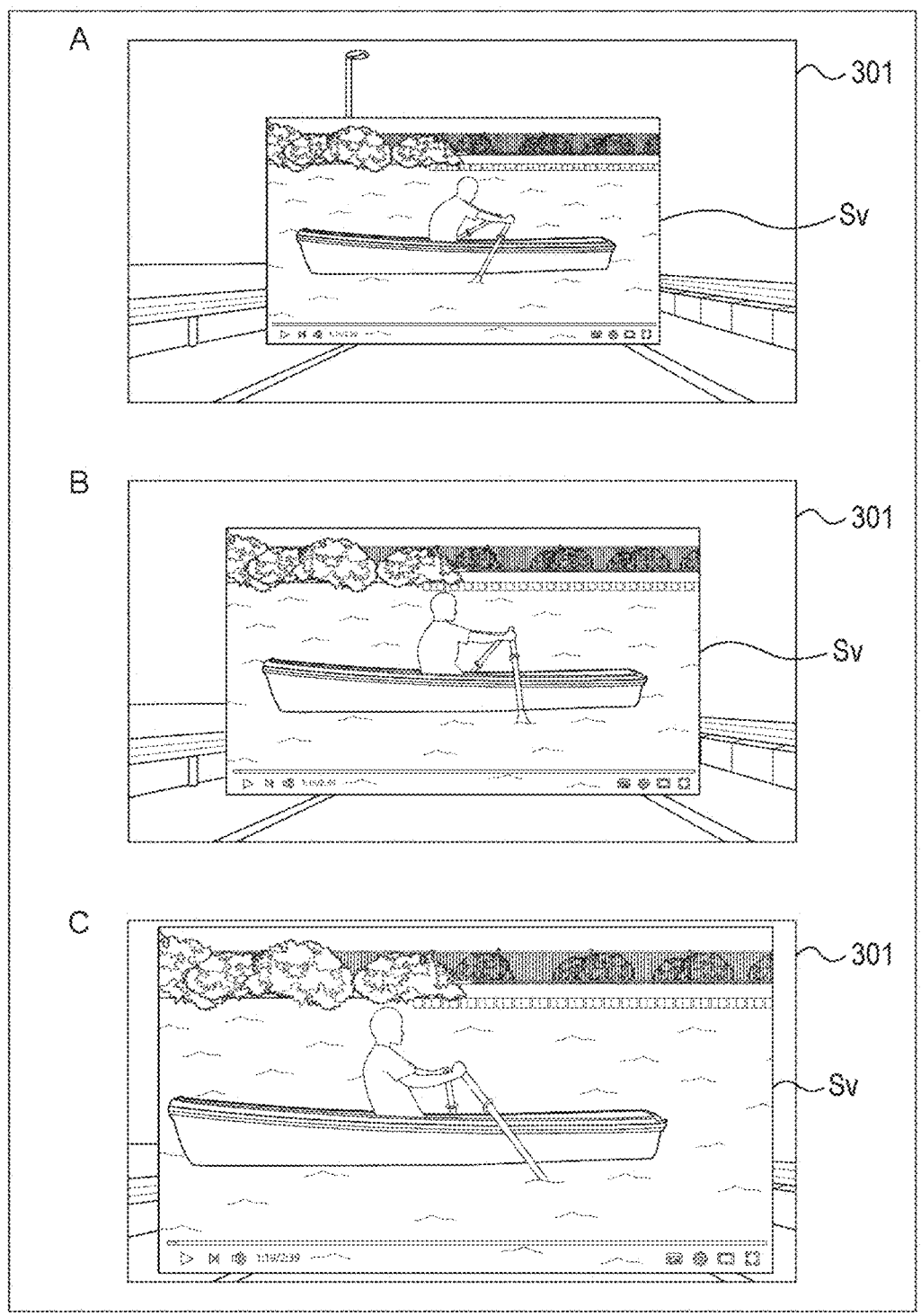
FIG. 14 illustrates an exemplary motion of the virtual screen in a case where the vehicle accelerates.

FIG. 14 illustrates an exemplary motion of the virtual screen Sv in a case where the vehicle 10 accelerates.

A of FIG. 14 illustrates the state of the virtual screen Sv before the vehicle 10 accelerates. The virtual screen Sv is set to the home position.

After that, even when the vehicle 10 starts accelerating, the virtual screen Sv travels straight at substantially the same velocity as before the vehicle 10 accelerates. Therefore, as illustrated in B and C of FIG. 14, the virtual screen Sv approaches the virtual point of view Pv, so that the virtual screen Sv increases gradually in size when viewed from the virtual point of view Pv.

Then, for example, when the virtual screen Sv reaches the upper limit in size, the virtual screen Sv finishes increasing in size. The upper limit in size of the virtual screen Sv is, for example, the size at the time when at least either the height or width of the virtual screen Sv reaches the height or width of the windshield 301. For example, in a case where the height of the virtual screen Sv reaches the height of the windshield 301 faster than the width of the virtual screen Sv reaches the width of the windshield 301, the size at the time when the height of the virtual screen Sv reaches the height of the windshield 301 is the upper limit in size of the virtual screen Sv. Meanwhile, for example, in a case where the width of the virtual screen Sv reaches the width of the windshield 301 faster than the height of the virtual screen Sv reaches the height of the windshield 301, the size at the time when the width of the virtual screen Sv reaches the width of the windshield 301 is the upper limit in size of the virtual screen Sv.

For example, when the vehicle 10 starts accelerating in a case where the virtual screen Sv is set to the home position and the following expression is satisfied: screen distance ds=standard distance ds0, the magnification m of each side of the virtual screen Sv is expressed by the following Expression (6).

$$m = 1/(1-(\alpha c/2ds0) \times t^2) \tag{6}$$

where t represents the elapsed time after the vehicle 10 starts accelerating. Furthermore, m represents the magnification to the length of each side of the virtual screen Sv set to the home position.

Figure 15:
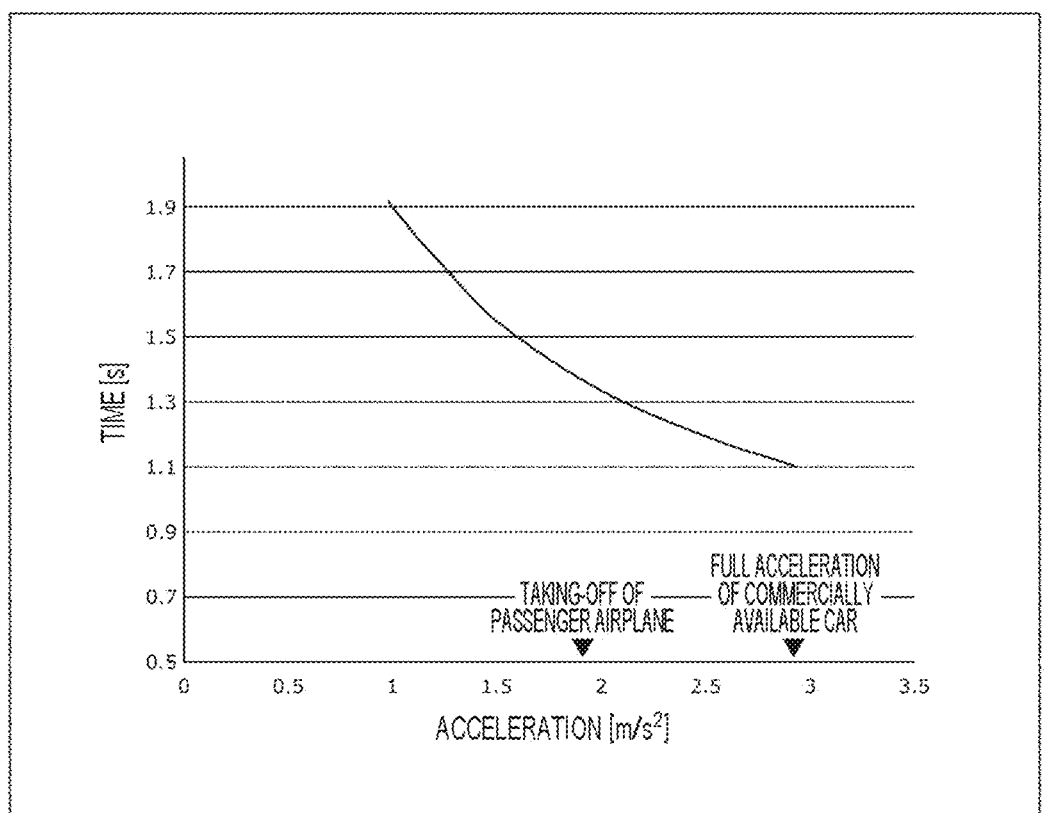
FIG. 15 is a graph of the relationship between the acceleration of the vehicle and the required time for the virtual screen to double in size.

FIG. 15 exemplifies the time required for the magnification m in Expression (6) to double. The horizontal axis of FIG. 15 represents the acceleration αc (in units of m/s$^2$) of the vehicle 10 and the vertical axis of FIG. 15 represents time (in units of seconds). Furthermore, the following expression is satisfied: standard distance ds0=3.6 m.

As indicated in the example, as the acceleration αc increases, the required time for the magnification m to double shortens. For example, in a case where the acceleration αc is 1.9 m/s$^2$ substantially the same as the acceleration at the time of taking-off of a passenger airplane, the required time is approximately 1.4 seconds. For example, in a case where the acceleration αc is 2.9 m/s$^2$ substantially the same as the full acceleration of a commercially available car, the required time is approximately 1.1 seconds.

If the virtual screen Sv continues to take similar motion even after reaching the upper limit in size, the virtual screen Sv protrudes from the windshield 301, so that the virtual screen Sv deteriorates in visibility. Furthermore, even if the virtual screen Sv remains at the upper limit in size, the virtual screen Sv accounts for most of the windshield 301.

Thus, the user has difficulty in sensing the scenery around the vehicle 10. As a result, motion sickness is likely to be induced to the user.

Thus, as described above, in a case where the virtual screen Sv reaches the upper limit in size, the velocity vs and acceleration αs of the virtual screen Sv are temporarily reset so as to be equal to the velocity and acceleration of the vehicle 10. In addition, the virtual screen Sv accelerates in the direction in which the virtual screen Sv returns to the home position.

Figure 16:
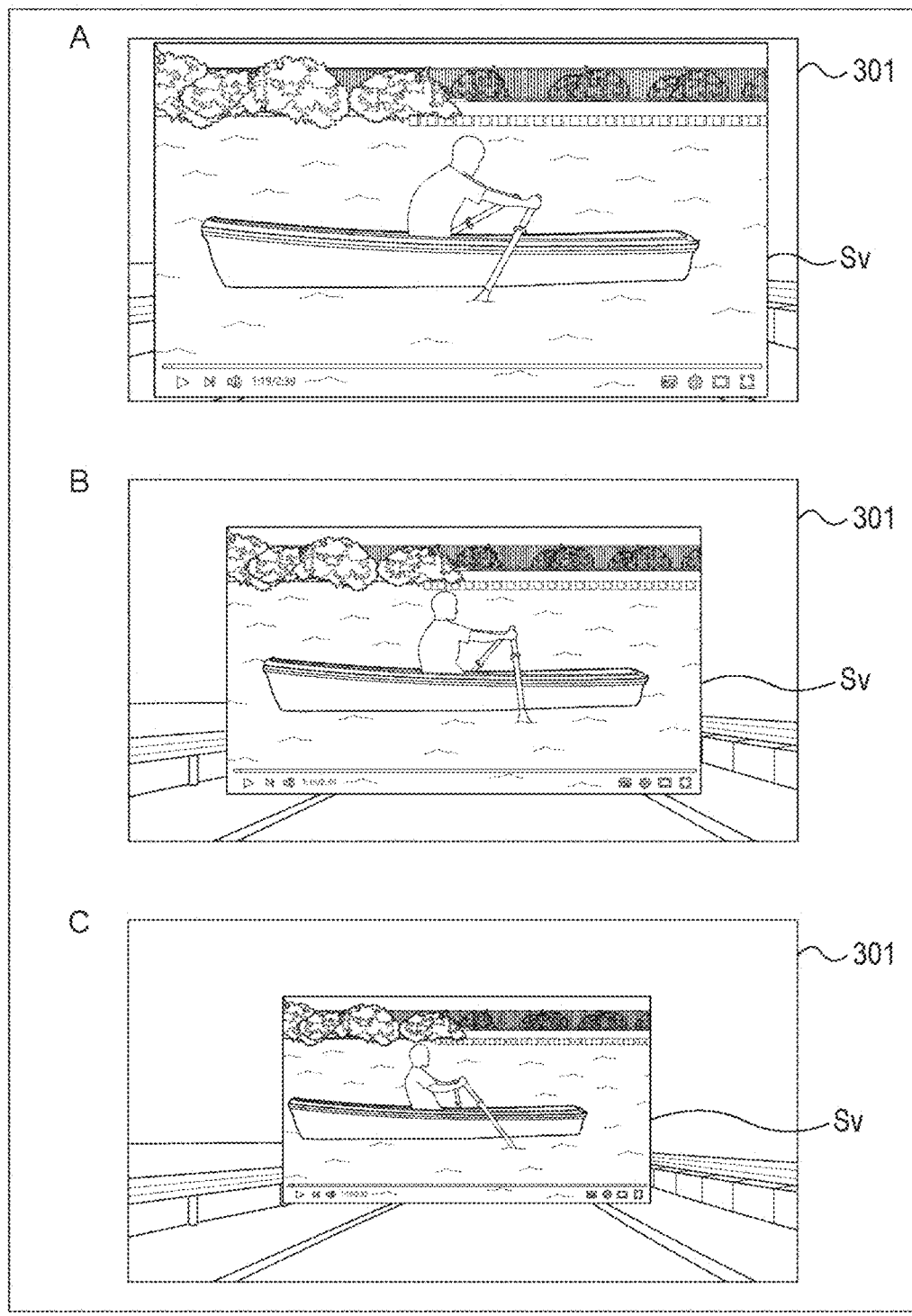
FIG. 16 illustrates, explanatorily, the motion of the virtual screen after the virtual screen reaches the upper limit in size.

Therefore, for example, as illustrated in A to C of FIG. 16, the virtual screen Sv reduces in size while moving away gradually when viewed from the virtual point of view Pv. Eventually, the virtual screen Sv returns to the home position.

However, the motion of the virtual screen Sv returning to the home position causes the user to sense acceleration different from the motion of the vehicle 10. Thus, motion sickness is likely to be induced. Therefore, the virtual screen Sv returns gradually to the home position such that the acceleration is not much sensed. For example, the acceleration of the virtual screen Sv moving away from the vehicle 10 when viewed from the virtual point of view Pv is inhibited from exceeding a predetermined threshold (e.g., 0.1 G).

Figure 17:
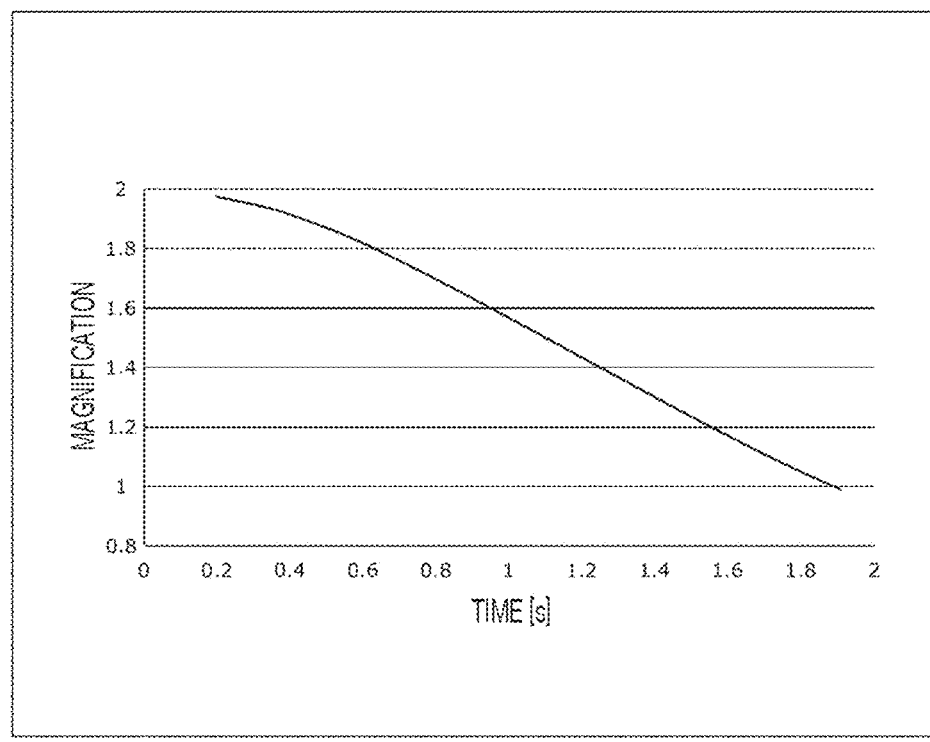
FIG. 17 is a graph of an exemplary transition in magnification of the virtual screen until the virtual screen returns to the home position after the virtual screen reaches the upper limit in size.

FIG. 17 illustrates the change in magnification of each side of the virtual screen Sv until the virtual screen Sv returns to the home position. The horizontal axis represents the elapsed time (in units of seconds) after the virtual screen Sv starts reducing in size, and the vertical axis represents the magnification to the length at the home position of each side of the virtual screen Sv. Furthermore, the acceleration of the virtual screen Sv in the direction in which the virtual screen Sv moves away from the virtual point of view Pv is 0.1 G, and the following expression is satisfied: standard distance ds0=3.6 m.

In this case, for example, approximately 1.9 seconds are required for each side of the virtual screen Sv to return from the double of the length at the home position to the original length (magnification=1).

<Case where Vehicle 10 Decelerates>

Next, the motion of the virtual screen Sv in a case where the vehicle 10 decelerates will be described with reference to FIGS. 18 to 20. More specifically, the motion of the virtual screen Sv in a case where the vehicle 10 decelerates while traveling straight forward will be described.

Figure 18:
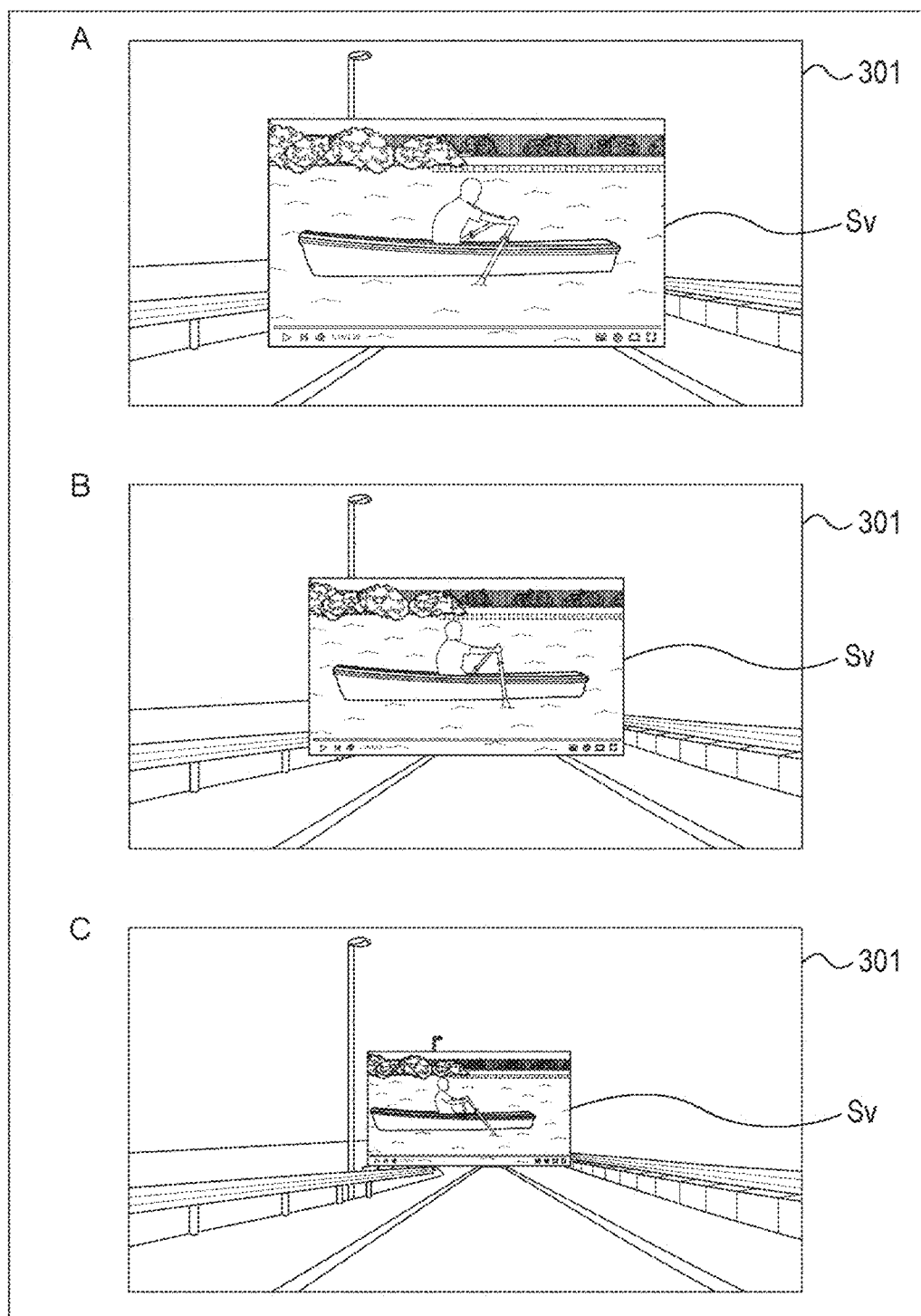
FIG. 18 illustrates an exemplary motion of the virtual screen in a case where the vehicle decelerates.

FIG. 18 illustrates an exemplary motion of the virtual screen Sv in a case where the vehicle 10 decelerates.

A of FIG. 18 illustrates the state of the virtual screen Sv before the vehicle 10 decelerates. The virtual screen Sv is set to the home position.

After that, even when the vehicle 10 starts decelerating, the virtual screen Sv travels straight at substantially the same velocity as before the vehicle 10 decelerates. Therefore, as illustrated in B and C of FIG. 18, the virtual screen Sv moves away from the virtual point of view Pv, so that the virtual screen Sv reduces gradually in size when viewed from the virtual point of view Pv.

Then, for example, when the virtual screen Sv reaches the lower limit in size, the virtual screen Sv finishes reducing in size.

Note that a certain time is required for the reduction in size of the virtual screen Sv to cause the user to sense the deceleration of the vehicle 10. Thus, the lower limit in size of the virtual screen Sv requires decreasing to a certain extent. Meanwhile, excessive reduction in size of the virtual screen Sv causes the virtual screen Sv to deteriorate in visibility.

Thus, the lower limit in size of the virtual screen Sv is determined on the basis of the trade-off between the visibility of the virtual screen Sv and the time required for the user to sense the deceleration of the vehicle 10 or the ratio of reduction.

If the virtual screen Sv continues to take similar motion even after reaching the lower limit in size, the virtual screen Sv further reduces in size, so that the virtual screen Sv deteriorates in visibility. Furthermore, even if the virtual screen Sv remains at the lower limit in size, the virtual screen Sv remains reduced in size. Thus, the virtual screen Sv deteriorates in visibility.

Thus, as described above, in a case where the virtual screen Sv reaches the lower limit in size, the velocity vs and acceleration αs of the virtual screen Sv are temporarily reset so as to be equal to the velocity and acceleration of the vehicle 10. In addition, the virtual screen Sv decelerates in the direction in which the virtual screen Sv returns to the home position (accelerates negatively).

Figure 19:
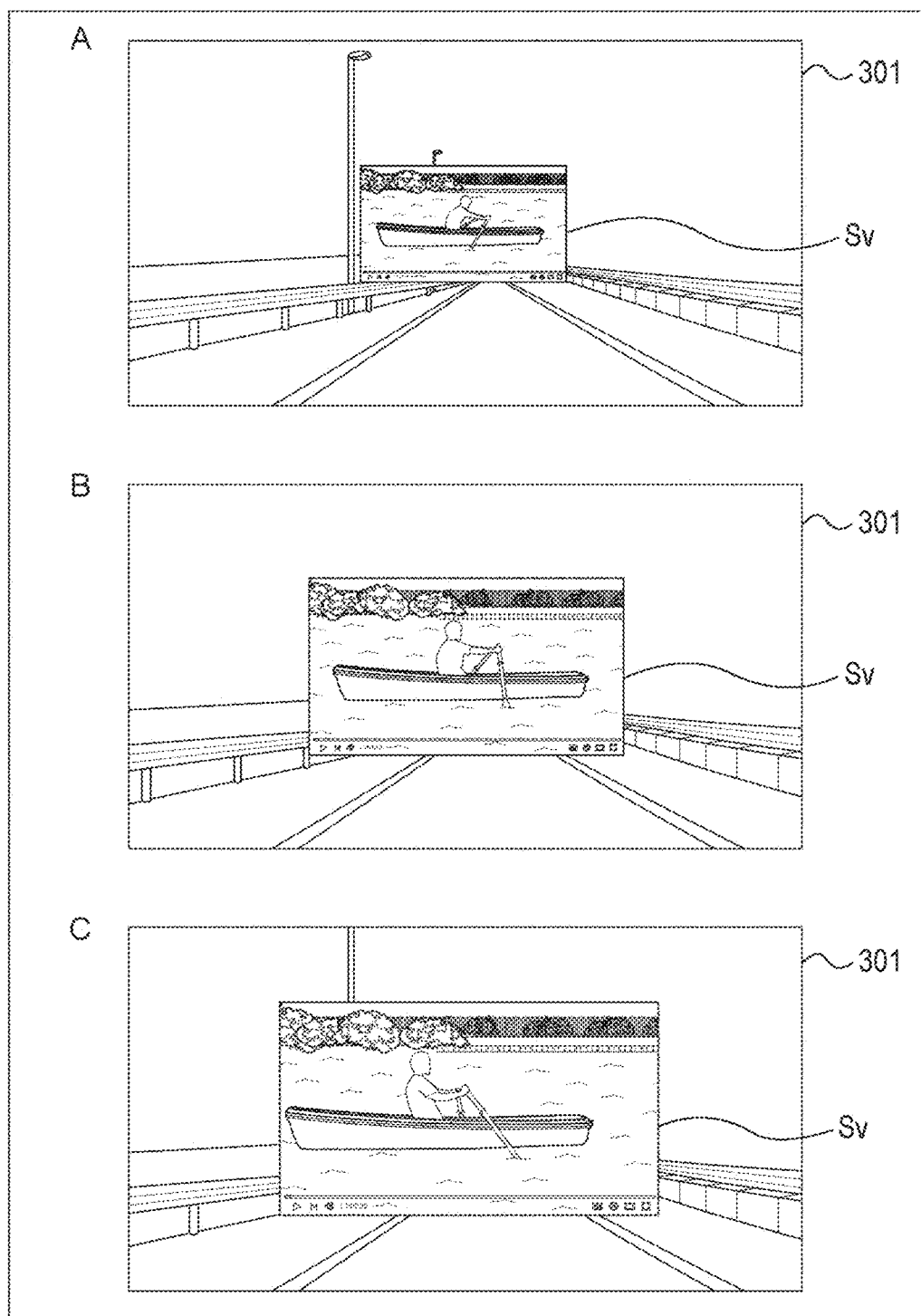
FIG. 19 illustrates, explanatorily, the motion of the virtual screen after the virtual screen reaches the lower limit in size.

Therefore, for example, as illustrated in A to C of FIG. 19, the virtual screen Sv increases in size while coming close gradually when viewed from the virtual point of view Pv. Eventually, the virtual screen Sv returns to the home position.

However, the motion of the virtual screen Sv returning to the home position causes the user to sense acceleration different from the motion of the vehicle 10. Thus, motion sickness is likely to be induced. Thus, the virtual screen Sv returns gradually to the home position such that the acceleration is not much sensed. For example, the acceleration of the virtual screen Sv coming close to the vehicle 10 when viewed from the virtual point of view Pv is inhibited from exceeding a predetermined threshold (e.g., 0.1 G).

Figure 20:
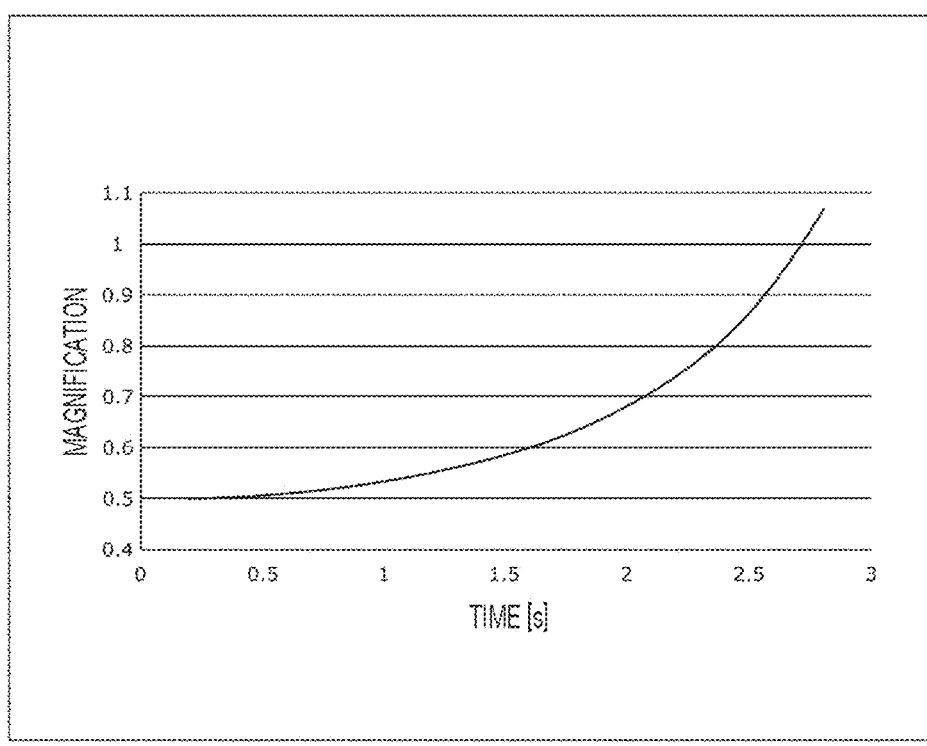
FIG. 20 is a graph of an exemplary transition in magnification of the virtual screen until the virtual screen returns to the home position after the virtual screen reaches the lower limit in size.

FIG. 20 illustrates the change in magnification of each side of the virtual screen Sv until the virtual screen Sv returns to the home position. The horizontal axis represents the elapsed time (in units of seconds) after the virtual screen Sv starts increasing in size, and the vertical axis represents the magnification to the length at the home position of each side of the virtual screen Sv. Furthermore, the acceleration of the virtual screen Sv in the direction in which the virtual screen Sv comes close to the virtual point of view Pv is 0.1 G, and the following expression is satisfied: standard distance ds0=3.6 m.

In this case, for example, approximately 2.7 seconds are required for each side of the virtual screen Sv to return from half of the length at the home position to the original length (magnification=1).

For example, in a case where automated driving of the vehicle 10 is performed with the above arrangement, the user in the vehicle 10 can appreciate content, such as a movie, less relevant to the operation of the vehicle 10, on a large screen.

Furthermore, in a case where the vehicle 10 turns, accelerates, or decelerates, the virtual screen Sv takes a motion inverse to that of the vehicle 10 when viewed from the user (virtual point of view Pv). That is, the virtual screen Sv accelerates and moves in the direction inverse to the vehicle 10 when viewed from the user. Therefore, even in a situation in which the user has difficulty in sensing the motion of the scenery around the vehicle 10 through a peripheral field of view because of the virtual screen Sv large in size, the user can sense the motion of the vehicle 10 while concentrating on the picture on the virtual screen Sv. As a result, the user can be prevented from suffering from motion sickness.

Moreover, after the virtual screen Sv reaches the left end or right end of the windshield 301 or after the virtual screen Sv reaches the upper limit or lower limit in size, the virtual screen Sv moves such that the user hardly senses acceleration. Then, the virtual screen Sv returns to the home position. Therefore, the visibility of the picture can be prevented from deteriorating with the user prevented from suffering from motion sickness.

3. Second Embodiment

Next, a second embodiment of the present technology will be described with reference to FIGS. 21 to 26.

Note that the second embodiment relates to the processing of the input unit 101, the output control unit 105, the output unit 106, the detection unit 131, the self-position estimation unit 132, the situation analysis unit 133, and the plan unit 134 in the vehicle control system 100 of FIG. 1.

Specifically, according to the first embodiment, the position of the virtual screen Sv is controlled on the basis of the actual motion of the vehicle 10. According to the second embodiment, the position of the virtual screen Sv is controlled on the basis of the predicted motion of the vehicle 10.

<Exemplary Configuration of Information Processing Unit 401>

Figure 21:
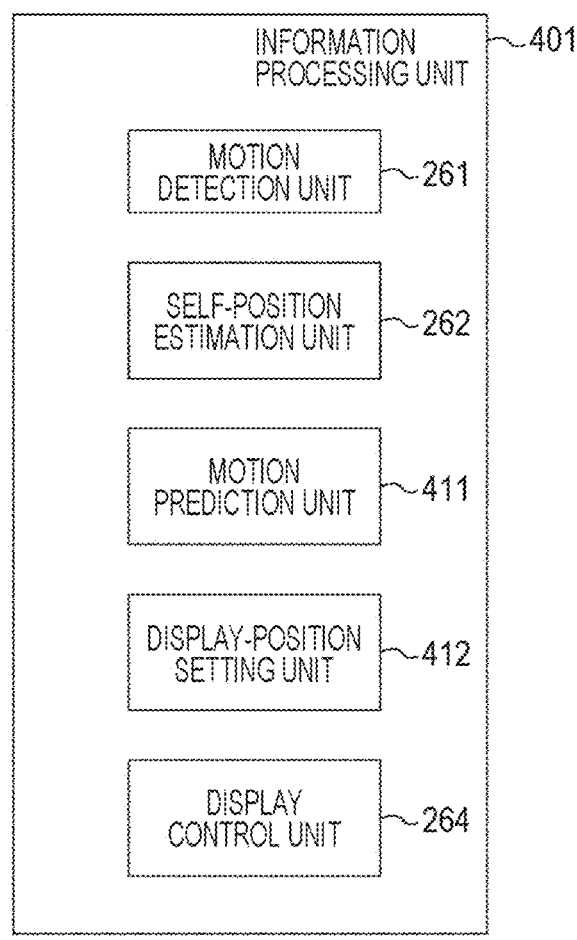
FIG. 21 is a block diagram of an information processing unit according to a second embodiment.

FIG. 21 illustrates an exemplary configuration of an information processing unit 401 achieved, for example, by execution of a predetermined control program by the CPU 202 and the GPU 203 in the information processing system 200 of FIG. 2. Note that parts in the figure corresponding to those in the information processing unit 251 of FIG. 3 are denoted with the same reference signs and the descriptions thereof will be appropriately omitted.

The information processing unit 401 is identical to the information processing unit 251 in that a motion detection unit 261, a self-position estimation unit 262, and a display control unit 264 are provided. However, the information processing unit 401 is different from the information processing unit 251 in that a motion prediction unit 411 is added and a display-position setting unit 412 is provided instead of a display-position setting unit 263.

The motion prediction unit 411 predicts the motion of the vehicle 10, on the basis of, for example, the route of the vehicle 10 planned by the route plan unit 161 of FIG. 1 and the action plan of the vehicle 10 planned by the action plan unit 162 of FIG. 1.

Note that, for example, the function of the motion prediction unit 411 may be provided to the motion detection unit 261.

On the basis of the predicted motion of the vehicle 10, the display-position setting unit 412 sets (moves) the position of the virtual screen Sv and the display position of a picture of the display device 204 corresponding to the position of the virtual screen Sv.

<Display Control Processing according to Second Embodiment>

Figure 22:
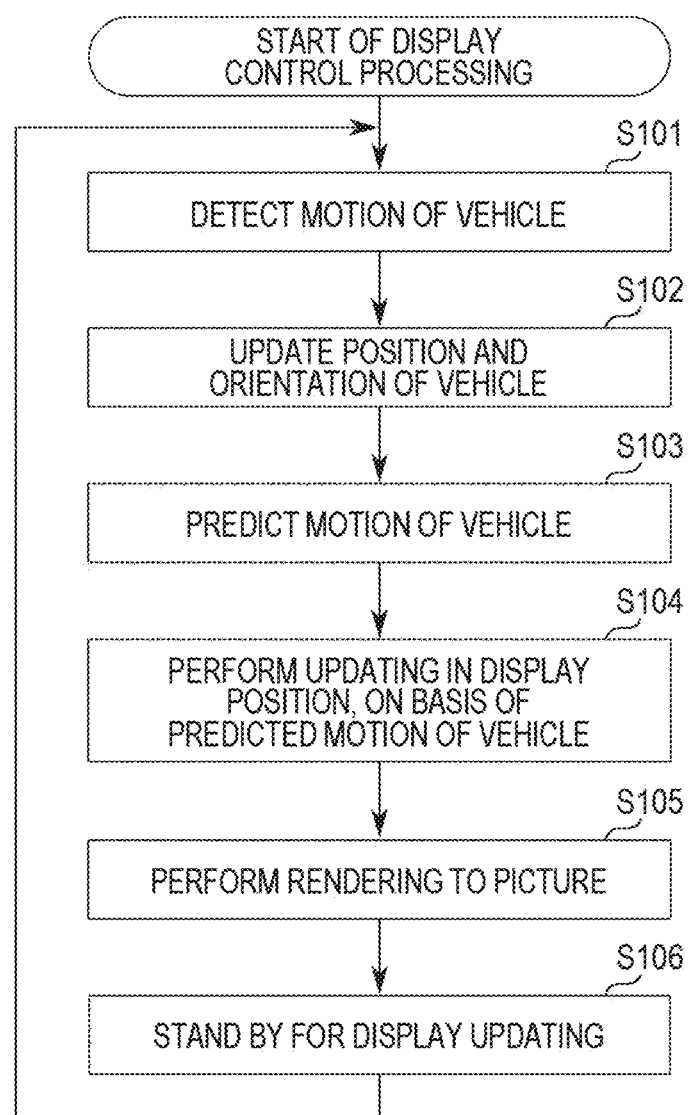
FIG. 22 is an explanatory flowchart of display control processing according to the second embodiment.

Next, display control processing according to the second embodiment that the information processing system 200 performs will be described with reference to the flowchart of FIG. 22.

In step S101, the motion detection unit 261 detects the motion of the vehicle 10. For example, the motion detection unit 261 detects the velocity vc, acceleration αc, rudder angle, and the like of the vehicle 10, on the basis of sensor data from the sensor unit 205.

Figure 4:
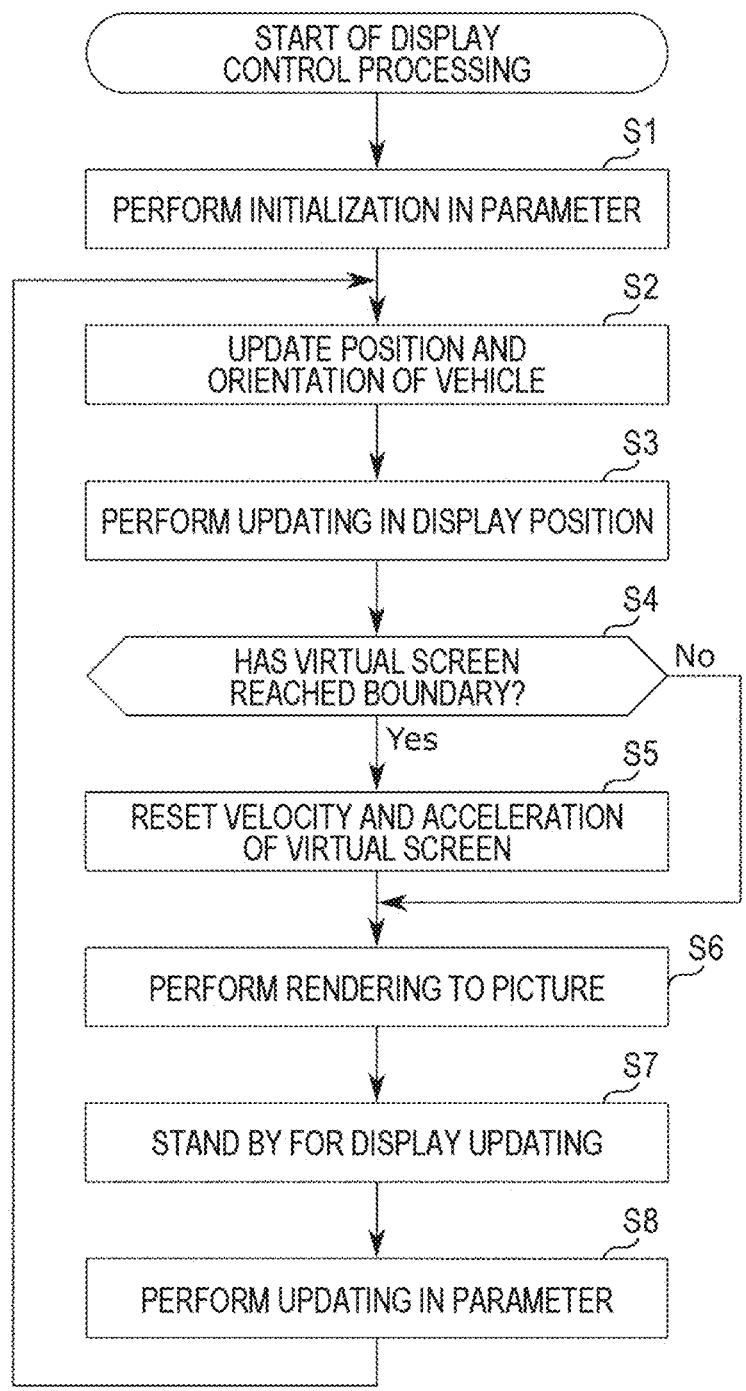
FIG. 4 is an explanatory flowchart of display control processing according to the first embodiment.

In step S102, the position and orientation of the vehicle 10 are updated, similarly to the processing in step S2 of FIG. 4

In step S103, the motion prediction unit 411 predicts the motion of the vehicle 10.

For example, the motion prediction unit 411 acquires, from the route plan unit 161, data indicating the route in the neighborhood of the current position of the vehicle 10. Furthermore, the motion prediction unit 411 acquires, from the action plan unit 162, data indicating the action plan of the vehicle 10 within a predetermined time from the present point in time. The motion prediction unit 411 predicts the nearest neighboring path of the vehicle 10, on the basis of the route and action plan of the vehicle 10 and the motion of the vehicle 10.

Note that any method can be employed for predicting the motion of the vehicle 10, and thus a different method can be adopted.

For example, the motion prediction unit 411 may recognize the direction in which the road leads, with image recognition and three-dimensional spatial recognition, such as simultaneous localization and mapping (SLAM), and may predict the direction of travel of the vehicle 10, on the basis of, for example, the steering angle, vehicle speed, and acceleration of the vehicle 10.

In step S104, the display-position setting unit 412 performs updating in display position, on the basis of the predicted motion of the vehicle 10.

For example, the display-position setting unit 412 disposes the virtual screen Sv on the nearest neighboring path of the vehicle 10.

Here, an exemplary method of setting the position of the virtual screen Sv will be described with reference to FIG. 23.

Figure 23:
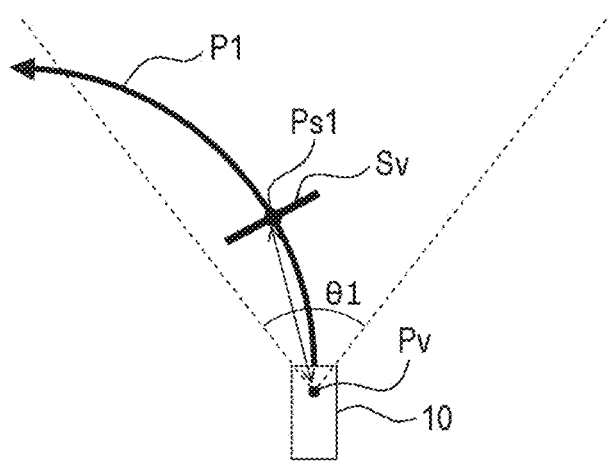
FIG. 23 illustrates an exemplary method of setting the position of a virtual screen.

FIG. 23 is a top view of the vehicle 10. A path P1 is the path of the vehicle 10 predicted by the motion prediction unit 411. An angle θ1 indicates a range outside the vehicle, visible from the virtual point of view Pv through the windshield 301.

For example, the display-position setting unit 412 sets the virtual screen Sv at a position Ps1 on the predicted path P1 apart from the virtual point of view Pv by the standard distance ds0 in direct distance. Furthermore, the display-position setting unit 412 performs setting such that the orientation of the virtual screen Sv (normal vector) is inverse to the direction of the predicted path P1 at the position Ps1. Therefore, the face of the virtual screen Sv is perpendicular to the predicted path P1.

Moreover, the display-position setting unit 412 calculates the screen angle θs, on the basis of the orientation of the vehicle 10 and the orientation of the virtual screen Sv. Then, similarly to the processing in step S3 of FIG. 4, the display-position setting unit 412 calculates the display position Pd of a picture, on the basis of the standard distance ds0 and the screen angle θs.

In step S105, similarly to the processing in step S6 of FIG. 4, the picture is subjected to rendering.

In step S106, similarly to the processing in step S7 of FIG. 4, the display control unit 264 stands by for display updating. Then, when the picture based on the data formed in the graphics memory 207 is displayed on the windshield 301, the processing goes back to step S101. Then, the processing is performed from step S101.

Figure 24:
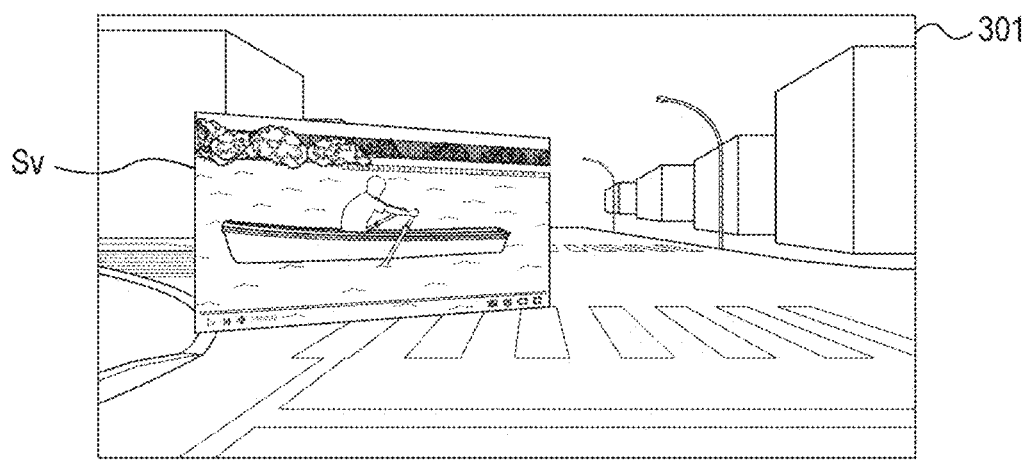
FIG. 24 illustrates an exemplary motion of the virtual screen.

Therefore, for example, as illustrated in FIG. 24, the virtual screen Sv moves on the predicted path P1 ahead of the vehicle 10. That is, the virtual screen Sv starts pivoting left ahead of the vehicle 10.

Figure 25:
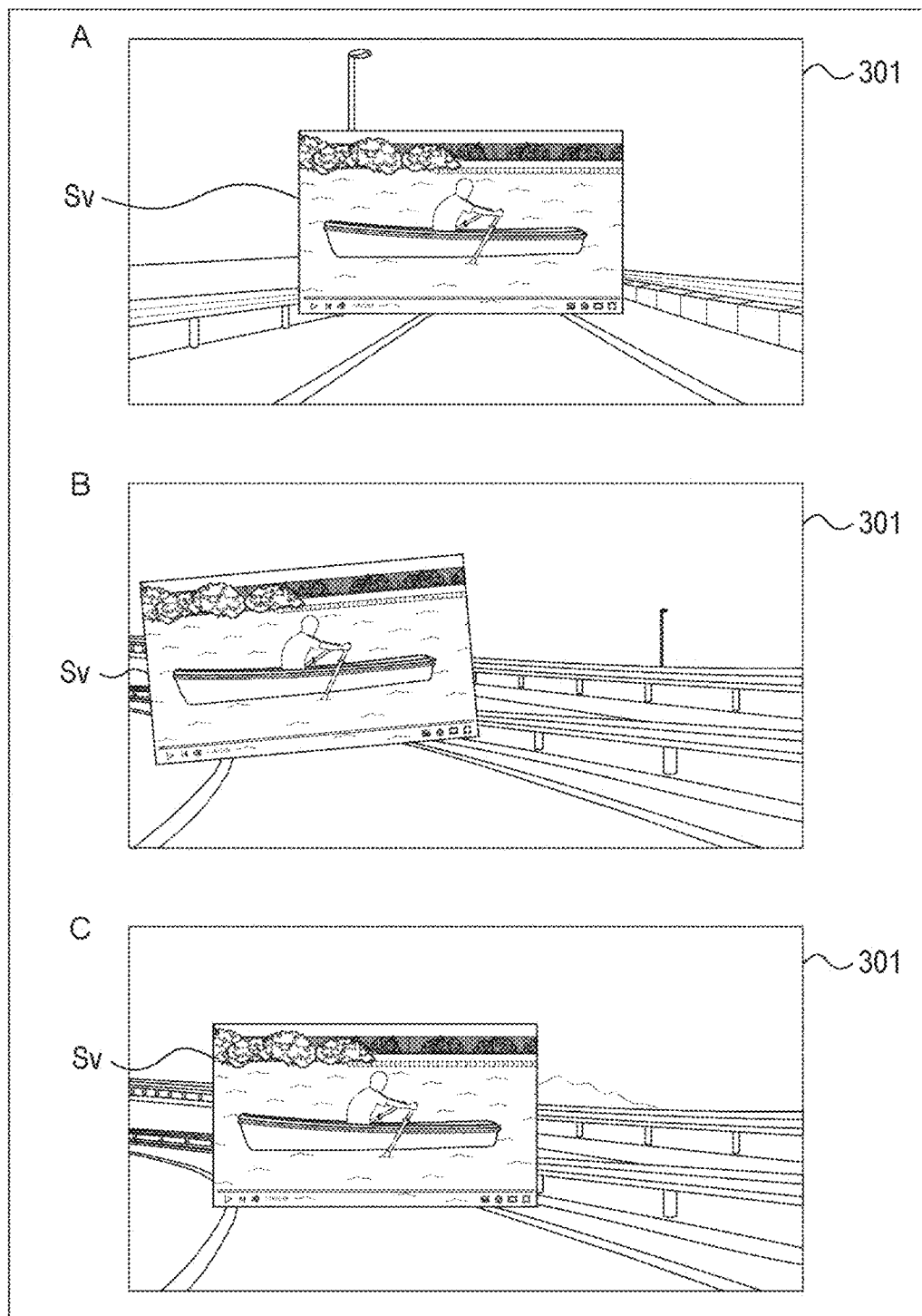
FIG. 25 illustrates an exemplary motion of the virtual screen.
Figure 26:
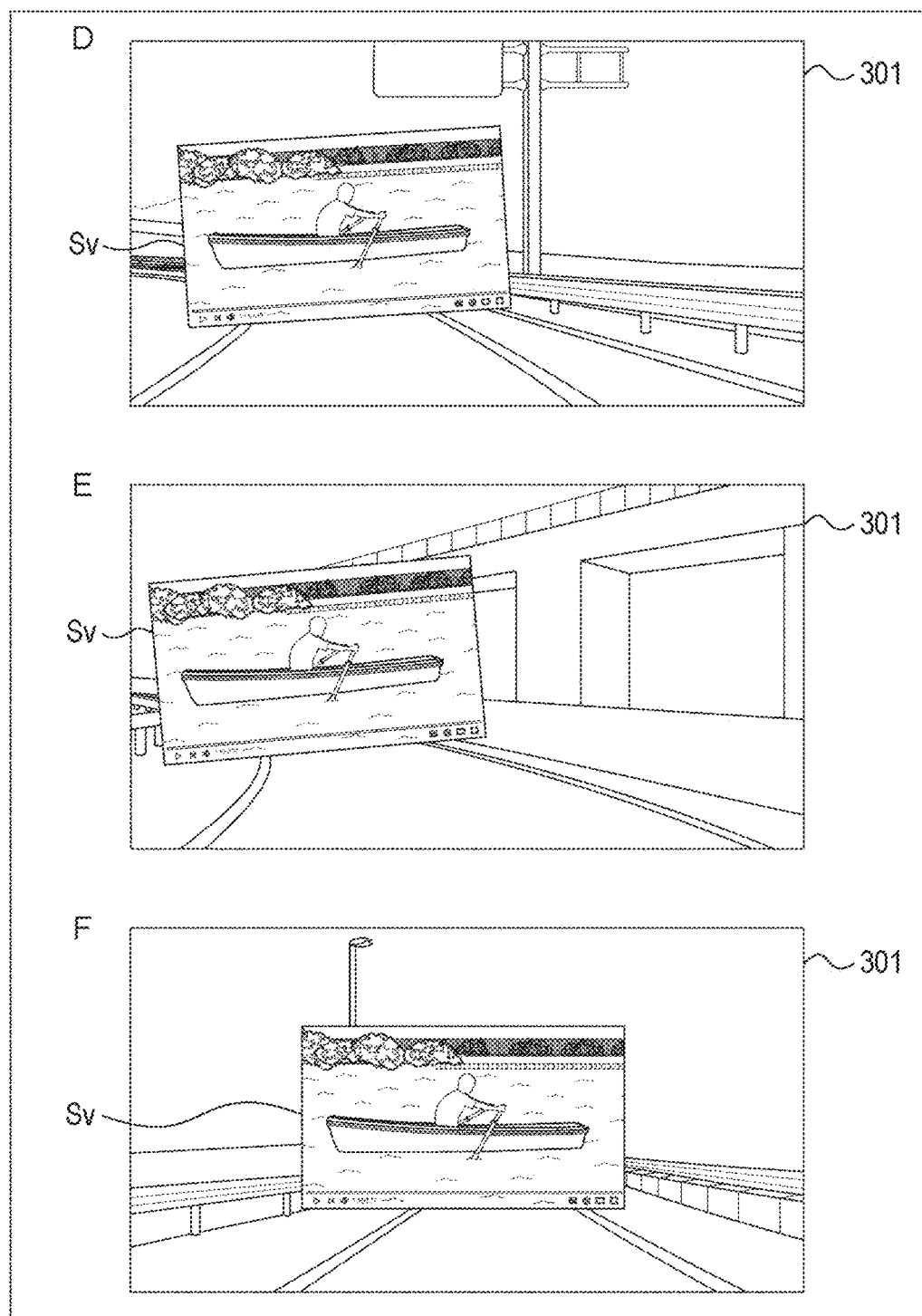
FIG. 26 illustrates an exemplary motion of the virtual screen.

Furthermore, for example, as illustrated in A to C of FIG. 25 and D to F of FIG. 26, with an interval retained substantially constant between the virtual screen Sv and the vehicle 10 (virtual point of view Pv), the virtual screen Sv moves while floating on the predicted path of the vehicle 10 ahead of the vehicle 10.

The motion of the virtual screen Sv is similar to, for example, the motion of a display on the back face of a truck viewed from the vehicle 10 that is following, at a certain distance, right behind the truck.

Therefore, the user can foresee the motion of the vehicle 10, on the basis of the motion of the virtual screen Sv. Thus, the user can grasp the motion of the vehicle 10 while concentrating on the picture on the virtual screen Sv. As a result, the user is prevented from suffering from motion sickness.

4. Modifications

Modifications of the embodiments of the present technology described above will be described below.

In the above description, the example in which the virtual screen Sv moves in the forward-and-backward direction and left-and-right direction of the vehicle 10, has been given. For example, the virtual screen Sv may move in the upward-and-downward direction of the vehicle 10. For example, in a case where the vehicle 10 accelerates upward, the virtual screen Sv may accelerate downward when viewed from the virtual point of view Pv. Conversely, in a case where the vehicle 10 accelerates downward, the virtual screen Sv may accelerate upward when viewed from the virtual point of view Pv.

Furthermore, in the above description, the example in which the virtual screen Sv pivots in the left-and-right direction when viewed from the virtual point of view Pv, has been given. The virtual screen Sv may move parallel in the left-and-right direction without pivoting. In this case, even when the virtual screen Sv moves in the left-and-right direction from the home position, the virtual screen Sv remains rectangular without deformation when viewed from the virtual point of view Pv.

Moreover, the virtual screen Sv may be variable in size for each user. For example, for a user who suffers easily from motion sickness, the visible amount of scenery around the vehicle 10 may rise with the virtual screen Sv reduced in size such that the user senses the motion of vehicle 10 easier. Furthermore, for example, the upper limit in size of the virtual screen Sv may drop at the time of acceleration of the vehicle 10. Meanwhile, for example, for a user who hardly suffers from motion sickness, the visibility of a picture may be improved with the virtual screen Sv increased in size. Furthermore, for example, the upper limit in size of the virtual screen Sv may rise at the time of acceleration of the vehicle 10.

Furthermore, in the above description, the example in which the display-position setting unit 263 sets the position of the virtual screen, has been given. For example, the display position of a picture may be set on the basis of the motion of the vehicle 10.

Furthermore, types of vehicles to which the present technology can be applied are not particularly limited. Furthermore, the present technology can be applied not only to the exemplified vehicle above but also to any movable object enabling display of a picture in superimposition on the ambient scenery or the picture of the ambient scenery. For example, an airplane, a ship, a train, and the like are conceivable.

5. Others

<Exemplary Configuration of Computer 22

The series of processing described above can be performed by hardware or by software. In a case where the series of processing is performed by software, a program included in the software is installed on a computer. Here, examples of the computer include a computer built in dedicated hardware, a general-purpose personal computer capable of performing various types of functions by installing various types of programs, and the like.

For example, in the information processing system 200 of FIG. 2, the CPU 202 loads, for example, the program stored in the memory 206 into a RAM (not illustrated) and executes the program, so that the series of processing described above is performed.

Furthermore, the program that the CPU 202 executes can be recorded in, for example, the storage device 209 as a packaged medium or the like, for provision. Furthermore, the program can be provided through a wired or wireless transfer medium, such as a local area network, the Internet, or digital satellite broadcasting.

For example, in the information processing system 200, the program can be installed onto the memory 206 through the bus 221 by attachment of the storage device 209. Furthermore, the network I/F 208 receives the program through the wired or wireless transfer medium, so that the program can be installed onto the memory 206. In addition, the program can be installed in advance onto a ROM (not illustrated) or the memory 206.

Note that the program that the computer executes may be a program for carrying out processing on a time-series basis in the order described in the present specification or may be a program for carrying out processing in parallel or with necessary timing, such as a timing when a call is made.

Furthermore, the system in the present specification means an aggregate of a plurality of constituent elements (e.g., devices and modules (components)), regardless of whether or not all the constituent elements are located in the same housing. Therefore, a plurality of devices connected through a network, the devices each being housed in a different housing, and one device including a plurality of modules housed in one housing, are involved all in the system.

Moreover, embodiments of the present technology are not limited to the embodiments described above, and thus various alterations can be made without departing from the scope of the gist of the present technology.

For example, the present technology can have a configuration of cloud computing in which a plurality of devices dividedly processes one function in cooperation through a network.

Furthermore, each step in each flowchart described above can be performed by one device or can be dividedly performed by a plurality of devices.

Moreover, in a case where one step includes a plurality of pieces of processing, the plurality of pieces of processing included in the one step can be performed by one device or can be dividedly performed by a plurality of devices.

<Exemplary Combinations of Configurations>

The present technology can also have the following configurations.

(1)

An information processing device including:

a display-position setting unit configured to move, on the basis of a motion of a movable object, a display position of a first picture viewed from a predetermined point of view of the movable object; and a display control unit configured to perform display control based on the display position set.

(2)

The information processing device according to (1) above, in which the display-position setting unit sets a position of a virtual screen corresponding to the first picture.

(3)

The information processing device according to (2) above, in which the display-position setting unit moves the position of the virtual screen, on the basis of acceleration of the movable object.

(4)

The information processing device according to (3) above, in which the display-position setting unit accelerates the virtual screen in a direction inverse to the movable object when viewed from the point of view.

(5)

The information processing device according to (4) above, in which the display-position setting unit moves the virtual screen, on the basis of a predetermined reference position.

(6)

The information processing device according to (5) above, in which the display-position setting unit moves the position of the virtual screen viewed from the point of view, in a forward-and-backward direction of the movable object and in a left-and-right direction of the movable object, and returns, in a case where the position of the virtual screen viewed from the point of view reaches a predetermined boundary in the forward-and-backward direction of the movable object or a predetermined boundary in the left-and-right direction of the movable object, the virtual screen gradually to the reference position.

(7)

The information processing device according to (6) above, in which the display-position setting unit sets, at a predetermined threshold or less, acceleration of the virtual screen viewed from the point of view in a case where the virtual screen returns to the reference position.

(8)

The information processing device according to any of (5) to (7) above, in which the display-position setting unit sets, in a case where the movable object moves forward at constant velocity, the position of the virtual screen to the reference position.

(9)

The information processing device according to any of (5) to (8) above, in which the display-position setting unit increases acceleration of the virtual screen toward the reference position as a difference between the position of the virtual screen and the reference position increases.

(10)

The information processing device according to (9) above, in which the display-position setting unit decreases the acceleration of the virtual screen toward the reference position as a difference between velocity of the virtual screen and velocity of the movable object increases.

(11)

The information processing device according to any of (5) to (10) above, in which the reference position is at substantially a center front of the movable object when viewed from the point of view.

(12)

The information processing device according to any of (2) to (11) above, in which the display-position setting unit changes an orientation of the virtual screen to the point of view, on the basis of the motion in a direction of turning of the movable object.

(13)

The information processing device according to (2) above, further including:

a motion prediction unit configured to predict the motion of the movable object, in which the display-position setting unit moves the position of the virtual screen, on the basis of the predicted motion of the movable object.

(14)

The information processing device according to (13) above, in which the display-position setting unit disposes the virtual screen on a predicted path of the movable object.

(15)

The information processing device according to (14) above, in which the display-position setting unit retains a distance substantially constant between the point of view and the virtual screen.

(16)

The information processing device according to (14) or (15) above, in which the display-position setting unit sets a face of the virtual screen substantially orthogonal to the predicted path of the movable object.

(17)

The information processing device according to any of (1) to (16) above, in which the display control unit superimposes the first picture on scenery around the movable object or on a second picture in which a vicinity of the movable object is shot.

(18)

An information processing method to be performed by an information processing device, the information processing method including:

moving, on the basis of a motion of a movable object, a display position of a picture viewed from a predetermined point of view of the movable object; and performing display control based on the display position set.

(19)

A program for causing a computer to perform processing including:

moving, on the basis of a motion of a movable object, a display position of a picture viewed from a predetermined point of view of the movable object; and performing display control based on the display position set.

(20)

A movable object including:

a motion detection unit configured to detect a motion of the movable object;

a display-position setting unit configured to move a display position of a picture viewed from a predetermined point of view, on the basis of the motion of the movable object; and a display control unit configured to perform display control based on the display position set.

Note that the effects in the present specification are just exemplary and are not limitative, and thus other effects may be provided.

REFERENCE SIGNS LIST

10 Vehicle
100 Vehicle control system
101 Input unit
102 Data acquisition unit
105 Output control unit
106 Output unit
131 Detection unit
132 Self-position estimation unit
133 Situation analysis unit
134 Plan unit
200 Information processing system
201 Camera
202 CPU
203 GPU
204 Display device
205 Sensor unit
251 Information processing unit
261 Motion detection unit
262 Self-position estimation unit
263 Display-position setting unit
264 Display control unit
301 Windshield
401 Information processing unit
411 Motion prediction unit
412 Display-position setting unit
Pv Virtual point of view
Pd Display position
Sv Virtual screen

The invention claimed is:

1. An information processing device comprising:
a display-position setting circuit configured to move, on a basis of a motion of a movable object, a display position of a first picture viewed from a point of view of the movable object; and
a display control circuit configured to perform display control based on the display position circuit, wherein the display-position setting circuit is configured to:
set a position of a virtual screen corresponding to the first picture,
move the position of the virtual screen, on a basis of acceleration of the movable object, and
accelerate the virtual screen in a direction inverse to the movable object when viewed from the point of view.

2. The information processing device according to claim 1, wherein
the display-position setting circuit is configured to move the virtual screen, on a basis of a predetermined reference position.

3. The information processing device according to claim 2, wherein
the display-position setting circuit is configured to move the position of the virtual screen viewed from the point of view, in a forward-and-backward direction of the movable object and in a left-and-right direction of the movable object, and returns, in a case where the position of the virtual screen viewed from the point of view reaches a predetermined boundary in the forward-and-backward direction of the movable object or a predetermined boundary in the left-and-right direction of the movable object, the virtual screen gradually to the reference position.

4. The information processing device according to claim 3, wherein
the display-position setting circuit is configured to set, at a predetermined threshold or less, acceleration of the virtual screen viewed from the point of view in a case where the virtual screen returns to the reference position.

5. The information processing device according to claim 2, wherein
the display-position setting circuit is configured to set, in a case where the movable object moves forward at constant velocity, the position of the virtual screen to the reference position.

6. The information processing device according to claim 2, wherein
the display-position setting circuit is configured to increase acceleration of the virtual screen toward the reference position as a difference between the position of the virtual screen and the reference position increases.

7. The information processing device according to claim 6, wherein
the display-position setting unit circuit is configured to decrease the acceleration of the virtual screen toward the reference position as a difference between velocity of the virtual screen and velocity of the movable object increases.

8. The information processing device according to claim 2, wherein
the reference position is at substantially a center front of the movable object when viewed from the point of view.

9. The information processing device according to claim 1, wherein
the display-position setting unit changes an orientation of the virtual screen to the point of view, on a basis of the motion in a direction of turning of the movable object.

10. The information processing device according to claim 1, further comprising:
a motion prediction circuit configured to predict the motion of the movable object, wherein
the display-position setting circuit is configured to move the position of the virtual screen, on a basis of the predicted motion of the movable object.

11. The information processing device according to claim 10, wherein
the display-position setting circuit is configured to dispose the virtual screen on a predicted path of the movable object.

12. The information processing device according to claim 11, wherein
the display-position setting circuit is configured to retain a distance substantially constant between the point of view and the virtual screen.

13. The information processing device according to claim 11, wherein
the display-position setting circuit is configured to set a face of the virtual screen substantially orthogonal to the predicted path of the movable object.

14. The information processing device according to claim 1, wherein
the display control circuit is configured to superimpose the first picture on scenery around the movable object or on a second picture in which a vicinity of the movable object is shot.

15. An information processing method to be performed by an information processing device, the information processing method comprising:
moving, on a basis of a motion of a movable object, a display position of a picture viewed from a point of view of the movable object, including setting a position of a virtual screen corresponding to the first picture, moving the position of the virtual screen, on a basis of acceleration of the movable object, and accelerating the virtual screen in a direction inverse to the movable object when viewed from the point of view; and performing display control based on the moving.

16. A non-transitory computer readable storage storing thereon a program for causing a computer to perform processing comprising:

moving, on a basis of a motion of a movable object, a display position of a picture viewed from a point of view of the movable object including setting a position of a virtual screen corresponding to the first picture, moving the position of the virtual screen, on a basis of acceleration of the movable object, and accelerating the virtual screen in a direction inverse to the movable object when viewed from the point of view; and performing display control based on the moving.

17. The non-transitory computer readable storage according to claim 16, wherein moving further includes:

disposing the virtual screen on a predicted path of the movable object, and setting a face of the virtual screen substantially orthogonal to the predicted path of the movable object.

18. The information processing method according to claim 16, wherein moving further includes:

disposing the virtual screen on a predicted path of the movable object, and setting a face of the virtual screen substantially orthogonal to the predicted path of the movable object.

19. A movable object comprising:

a motion detection circuit configured to detect a motion of the movable object;

a display-position setting circuit configured to move a display position of a picture viewed from a point of view, on a basis of the motion of the movable object; and a display control circuit configured to perform display control based on the display position circuit, wherein the display-position setting circuit is configured to:

set a position of a virtual screen corresponding to the first picture, move the position of the virtual screen, on a basis of acceleration of the movable object, and accelerate the virtual screen in a direction inverse to the movable object when viewed from the point of view.

20. The movable object according to claim 19, wherein the display-position setting circuit is configured to dispose the virtual screen on a predicted path of the movable object, and set a face of the virtual screen substantially orthogonal to the predicted path of the movable object.

* * * * *